US011574483B2

(12) United States Patent
Katrenko et al.

(10) Patent No.: US 11,574,483 B2
(45) Date of Patent: Feb. 7, 2023

(54) METHODS AND SYSTEMS FOR COMPUTER-BASED DETERMINING OF PRESENCE OF OBJECTS

(71) Applicant: YANDEX SELF DRIVING GROUP LLC, Moscow (RU)

(72) Inventors: Petr Vadimovich Katrenko, Lyubertsy (RU); Vyacheslav Vladimirovich Murashkin, Moscow (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 317 days.

(21) Appl. No.: 16/986,967

(22) Filed: Aug. 6, 2020

(65) Prior Publication Data
US 2021/0192236 A1 Jun. 24, 2021

(30) Foreign Application Priority Data
Dec. 24, 2019 (RU) .......................... RU2019143606

(51) Int. Cl.
*G06V 20/58* (2022.01)
*G06T 7/70* (2017.01)
(Continued)

(52) U.S. Cl.
CPC ............ *G06V 20/58* (2022.01); *G06N 20/00* (2019.01); *G06T 7/0002* (2013.01); *G06T 7/70* (2017.01);
(Continued)

(58) Field of Classification Search
None
See application file for complete search history.

(56) References Cited

U.S. PATENT DOCUMENTS 9,058,247 B2   6/2015  Fukamachi et al.
9,785,828 B2   10/2017 Ayvaci et al.
(Continued)

FOREIGN PATENT DOCUMENTS

CN   106291736 A   1/2017
CN   108241370 A   7/2018
(Continued)

OTHER PUBLICATIONS

He Mengwen, E. Takeuchi, Y. Ninomiya and S. Kato, "Robust virtual scan for obstacle Detection in urban environments," 2016 IEEE Intelligent Vehicles Symposium (IV), Gothenburg, 2016, pp. 683-690.
(Continued)

*Primary Examiner* — Leon Viet Q Nguyen
(74) *Attorney, Agent, or Firm* — BCF LLP

(57) ABSTRACT

A method and an electronic device for determining a presence of an obstacle in a surrounding area of a self-driving car (SDC) are provided. The method comprises receiving sensor data representative of the surrounding area of the SDC in a form of 3D point cloud data; generating, by an MLA, based on the 3D point cloud data, a set of feature vectors representative of the surrounding area; generating, by the MLA, a grid representation of the surrounding area, each given cell of the grid representation including a predicted distance parameter indicative of a distance from the given cell to a closest cell with the obstacle; and using, by the electronic device, the distance parameter to determine presence of the obstacle in the surrounding area of the SDC.

19 Claims, 12 Drawing Sheets

(51) Int. Cl.
*G06N 20/00* (2019.01)
*G06T 7/00* (2017.01)

(52) U.S. Cl.
CPC .............. *G06T 2207/10028* (2013.01); *G06T 2207/20081* (2013.01); *G06T 2207/30261* (2013.01)

(56) References Cited

U.S. PATENT DOCUMENTS

| | | |
|---|---|---|
| 9,823,661 B2 | 11/2017 | Pink et al. |
| 10,134,152 B2 | 11/2018 | Mottin et al. |
| 10,195,992 B2 | 2/2019 | Gerardo et al. |
| 10,290,116 B2 | 5/2019 | Laugier et al. |
| 10,303,178 B1 | 5/2019 | Gutmann |
| 10,580,158 B1 * | 3/2020 | Mousavian ............... G06T 7/50 |
| 11,062,454 B1 * | 7/2021 | Cohen .................. G01S 13/865 |
| 2002/0080014 A1 | 6/2002 | McVarthy et al. |
| 2006/0176160 A1 | 8/2006 | Zoratti et al. |
| 2006/0184297 A1 | 8/2006 | Huggings-Luthman |
| 2010/0328644 A1 | 12/2010 | Lu et al. |
| 2017/0357267 A1 | 12/2017 | Foster et al. |
| 2018/0089505 A1 | 3/2018 | El-Khamy et al. |
| 2018/0231650 A1 | 8/2018 | Heitzmann et al. |
| 2018/0247216 A1 | 8/2018 | Mottin et al. |
| 2018/0345958 A1 | 12/2018 | Lo et al. |
| 2018/0349746 A1 | 12/2018 | Vallespi-Gonzalez et al. |
| 2018/0364717 A1 * | 12/2018 | Douillard ............... G05D 1/024 |
| 2019/0049239 A1 | 2/2019 | Natroshvili et al. |
| 2019/0087666 A1 | 3/2019 | Zhang et al. |
| 2019/0122037 A1 | 4/2019 | Russell et al. |
| 2019/0371052 A1 * | 12/2019 | Kehl ........................ G06T 7/521 |
| 2021/0096241 A1 * | 4/2021 | Bongio Karrman ... G06V 20/70 |
| 2021/0209339 A1 * | 7/2021 | You ........................ G06N 3/04 |

FOREIGN PATENT DOCUMENTS

| | | |
|---|---|---|
| CN | 108674185 A | 10/2018 |
| DE | 102014200279 A1 | 7/2015 |
| DE | 102017217972 A1 | 4/2019 |
| KR | 101041930 B1 | 6/2011 |
| KR | 20140004409 A | 1/2014 |
| RU | 2656711 C2 | 6/2018 |
| WO | 2016067640 A1 | 5/2016 |
| WO | 2016156236 A1 | 10/2016 |
| WO | 2018055377 A1 | 3/2018 |
| WO | 2018091386 A1 | 5/2018 |
| WO | 2019072674 A1 | 4/2019 |

OTHER PUBLICATIONS

Hesham, "Static Free Space Detection with Laser Scanner using Occupancy Grid Maps", Conference Record—IEEE Conference on Intelligent Transportation Systems—Jan. 2018.
Russian Search Report dated Nov. 5, 2020 issued in respect of the counterpart Russian Patent Application No. RU2019143606.
Extended European Search Report completed on Mar. 5, 2021 issued in respect of the counterpart European Patent Application No. 20197972.1.
Han Luxin et al. "FIESTA: Fast Incremental Euclidean Distance Fields for Online Motion Planning of Aerial Robots", 2019 IEEE/RSJ International conference on intelligent robots and systems (IROS), IEEE, Nov. 3, 2019 (Nov. 3, 2019), pp. 4423-4430, XP033695780, DOI: 10.1109/IROS40897.2019.8968199.
Park Jeong Joon et al. "DeepSDF: Learning Continuous Signed Distance Functions for Shape Representation", 2019 IEEE/CVF conference on computer vision and pattern recognition (CVPR), IEEE, Jun. 15, 2019 (Jun. 15, 2019), pp. 165-17 4, XP033687152, DOI: 10.1109/CVPR.2019.00025.

* cited by examiner

METHODS AND SYSTEMS FOR COMPUTER-BASED DETERMINING OF PRESENCE OF OBJECTS

CROSS-REFERENCE

The present application claims priority to Russian Patent Application No. 2019143606, entitled "Methods and Systems for Computer-Based Determining of Presence of Objects," filed on Dec. 24, 2019, the entirety of which is incorporated herein by reference.

FIELD OF TECHNOLOGY

The present technology relates to computer-implemented methods and systems for determining presence of an object, more specifically, to methods and systems for determining the presence of objects around a self driving car (SDC) using an occupancy grid.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, brake, stop, change lane and self-park.

One of the main technical challenges in implementing the above computer systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

A typical autonomous vehicle or self-driving car (SDC), for short, comprises a plurality of sensors to enable the SDC to capture and "understand" its surround area. Typically, more than one type of sensors is used. For example, a given implementation of the SDC can include one or more cameras, one or more LIDARs, and one or more radars.

It is generally known for the SDC to process data captured by such the plurality of sensors to generate a prediction, typically using a Machine Learning Algorithm (MLA) in regard to presence of one or more objects in the vicinity of the SDC. Such the prediction can then be used by the SDC to determine the most optimal current maneuver, be it to continue driving, stop, change direction, accelerate, or the like.

US 2019/0049239 (published Feb. 14, 2019 and assigned to Intel IP Corporation) discloses an occupancy grid object determining device, which may include a grid generator configured to generate an occupancy grid of a predetermined region, the occupancy grid including a plurality of grid cells and at least some of the grid cells having been assigned an information about the occupancy of the region represented by the respective grid cell, a determiner configured to determine at least one object in the occupancy grid wherein the at least one object includes a plurality of grid cells, and a remover configured to remove occupancy information from at least one grid cell of the plurality of grid cells of the determined object.

U.S. Pat. No. 10,195,992 (published Feb. 5, 2019 and assigned to Ford Global Technologies, LLC) discloses an obstacle detection systems and methods are described. In one implementation, a method receives data from at least one sensor mounted to a vehicle and creates a probabilistic grid-based map associated with an area near the vehicle. The method also determines a confidence associated with each probability in the grid-based map and determines a likelihood that an obstacle exists in the area near the vehicle based on the probabilistic grid-based map.

SUMMARY

It is an object of the present technology to ameliorate at least some of the inconveniences present in the prior art.

The non-limiting embodiments of the present technology are directed to a method of generating and using an occupancy grid, whereby a given cell of the occupancy grid includes a predicted distance to a closest object (i.e. another cell of the occupancy grid which has an object located therein, as manifested by an associated value in the other cell being zero—indicative of a zero-distance to an object).

In one broad aspect of the present technology, there is provided a method for determining a presence of an obstacle in a surrounding area of a self-driving car (SDC) based on sensor data acquired by a sensor mounted on the SDC. The method is executable by an electronic device coupled to the SDC. The electronic device executes a machine learning algorithm (MLA) having been trained for obstacle detection based on sensor data. The method comprises: receiving, by the electronic device, sensor data representative of the surrounding area of the SDC in a form of 3D point cloud data; generating, by the MLA, based on the 3D point cloud data, a set of feature vectors representative of the surrounding area; receiving map data indicative of a localization of the SDC on a map; generating, by the MLA, based on the set of feature vectors and the map data, a grid representation of the surrounding area, each given cell of the grid representation including a predicted distance parameter indicative of a distance from the given cell to a closest cell with the obstacle; using, by the electronic device, the distance parameter to determine presence of the obstacle in the surrounding area of the SDC.

In some implementations of the method, the predicted distance parameter is further associated with an indication of a confidence level in the predicted distance parameter, the confidence level having been predicted by the MLA.

In some implementations of the method, the MLA comprises a first model and a second model.

In some implementations of the method, the set of feature vectors representative of the surrounding area is generated by the first model.

In some implementations of the method, the generating, based on the 3D point cloud data, the set of feature vectors representative of the surrounding area comprises: generating a tensor having a plurality of cells, each cell being associated with a position in the 3D point cloud data; generating, by the first model, a given vector associated with a given point of the 3D point cloud data; associating the given vector with an associated cell of the 3D point cloud data.

In some implementations of the method, the method further comprises generating an amalgamated vector associated with a column of the tensor.

In some implementations of the method, the generating the amalgamated vector comprises concatenating a totality of given vectors associated with the cells of the column of the tensor.

In some implementations of the method, the given vector is representative of at least geometrical position of the given point of the 3D point cloud data.

In some implementations of the method, the first model comprises a PointNet model.

In some implementations of the method, the generating the grid representation of the surrounding area is executed by the second model.

In some implementations of the method, the second model comprises a U-Net model.

In some implementations of the method, the second model is configured to generate the predicted distance parameter based on an output of the first model.

In some implementations of the method, the output of the first model comprises: a tensor having a plurality of cells, each cell being associated with an amalgamated vector associated with a respective column of the tensor previously generated by the first model; a given amalgamated vector being representative of at least geometrical positions of points of the 3D point cloud data placed in a given cell of the tensor.

In some implementations of the method, the method further comprises training the MLA, the training being executed prior to the receiving.

In some implementations of the method, the training the MLA comprises using a training set, the training set including a training grid with an indication of a distance to a closest training object.

In some implementations of the method, the indication of the distance to the closest training object is an actual distance used as a ground truth for training.

In some implementations of the method, the method further comprises identifying, by the MLA, cells of the grid representation with un-detected objects.

In some implementations of the method, the identifying, by the MLA, cells of the grid representation with un-detected obstacles comprises: determining a first cell of the grid representation having a predicted presence indicator of an obstacle; determining a second cell of the grid representation located in a pre-determined spaced relationship to the first cell, the second cell not having the predicted presence indicator of the obstacle; in response to a confidence parameter of the first cell being above a pre-determined threshold and in response to a projection trigger being present, augmenting the second cell with the predicted presence indicator of the obstacle.

In some implementations of the method, the augmenting the second cell with the predicted presence indicator of the object comprises assigning a confidence parameter that is lower than the respective confidence parameter of the first cell.

In some implementations of the method, the projection trigger comprises an expected change parameter for the object from the first cell and the second cell.

In some implementations of the method, wherein the expected change parameter is based at least in part on a speed parameter of the SDC.

In another broad aspect of the present technology, there is provided an electronic device. The electronic device comprises: a processor; a non-transitory computer-readable medium comprising instructions, the instructions for executing at least a machine learning algorithm (MLA) having been trained for obstacle detection based on sensor data; a communication interface for communicating with a sensor mounted on a vehicle. The processor, upon executing the instructions, is configured to: receive sensor data representative of the surrounding area of the SDC in a form of 3D point cloud data; generate, by the MLA, based on the 3D point cloud data, a set of feature vectors representative of the surrounding area; receive map data indicative of a localization of the SDC on a map; generate, by the MLA, based on the set of feature vectors and the map data, a grid representation of the surrounding area, each given cell of the grid representation including a predicted distance parameter indicative of a distance from the given cell to a closest cell with an obstacle; use the distance parameter to determine presence of the obstacle in the surrounding area of the SDC.

In some implementations of the electronic device, the MLA comprises a first model and a second model, and wherein the processor is configured to: generate the set of feature vectors representative of the surrounding area using the first model; and generate the grid representation of the surrounding area using the second model.

In some implementations of the electronic device, the processor, configured to generate, based on the 3D point cloud data, the set of feature vectors representative of the surrounding area, is further configured to: generate a tensor having a plurality of cells, each cell being associated with a position in the 3D point cloud data; generate, by the first model, a given vector associated with a given point of the 3D point cloud data; associate the given vector with an associated cell of the 3D point cloud data.

In some implementations of the electronic device, the processor is further configured to generate an amalgamated vector associated with a column of the tensor.

In some implementations of the electronic device, the processor is configured to generate the amalgamated vector associated with the column of the tensor by concatenating a totality of given vectors associated with the cells of the column of the tensor.

In some implementations of the electronic device, the processor is further configured to identify, by the MLA, cells of the grid representations with un-detected obstacles, and the processor is configured to: determine a first cell of the grid representation having a predicted presence indicator of an obstacle; determine a second cell of the grid representation located in a pre-determined spaced relationship to the first cell, the second cell not having the predicted presence indicator of the obstacle; in response to a confidence parameter of the first cell being above a pre-determined threshold and in response to a projection trigger being present, augment the second cell with the predicted presence indicator of the obstacle.

In some implementations of the electronic device, the processor is further configured to assign a confidence parameter that is lower than the respective confidence parameter of the first cell.

In some implementations of the electronic device, the processor is further configured, prior to receiving, to train the MLA.

In some implementations of the electronic device, the processor is configured to train the MLA using a training set, the training set including a training grid with an indication of a distance to a closest training object.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
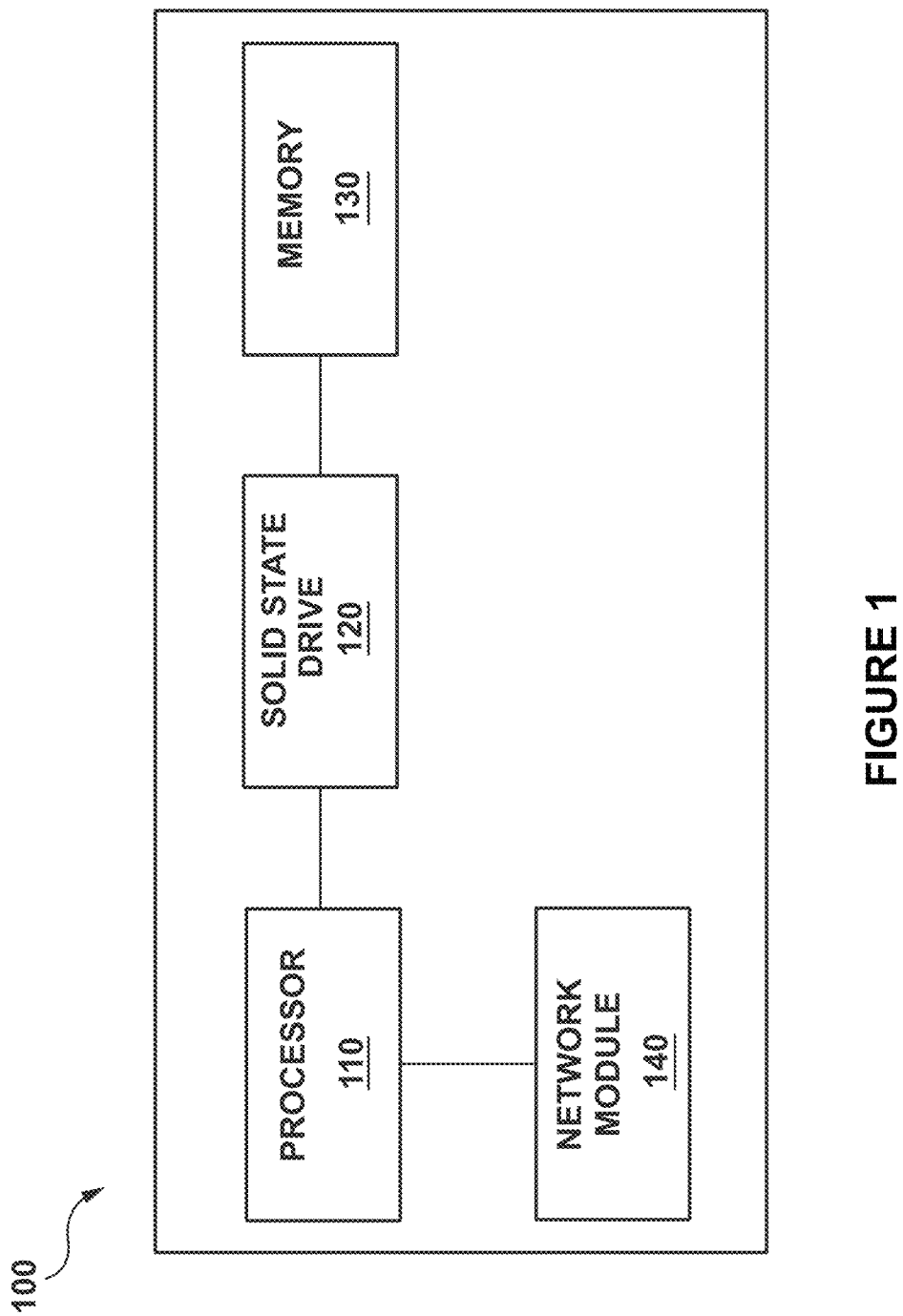
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Figure 2:
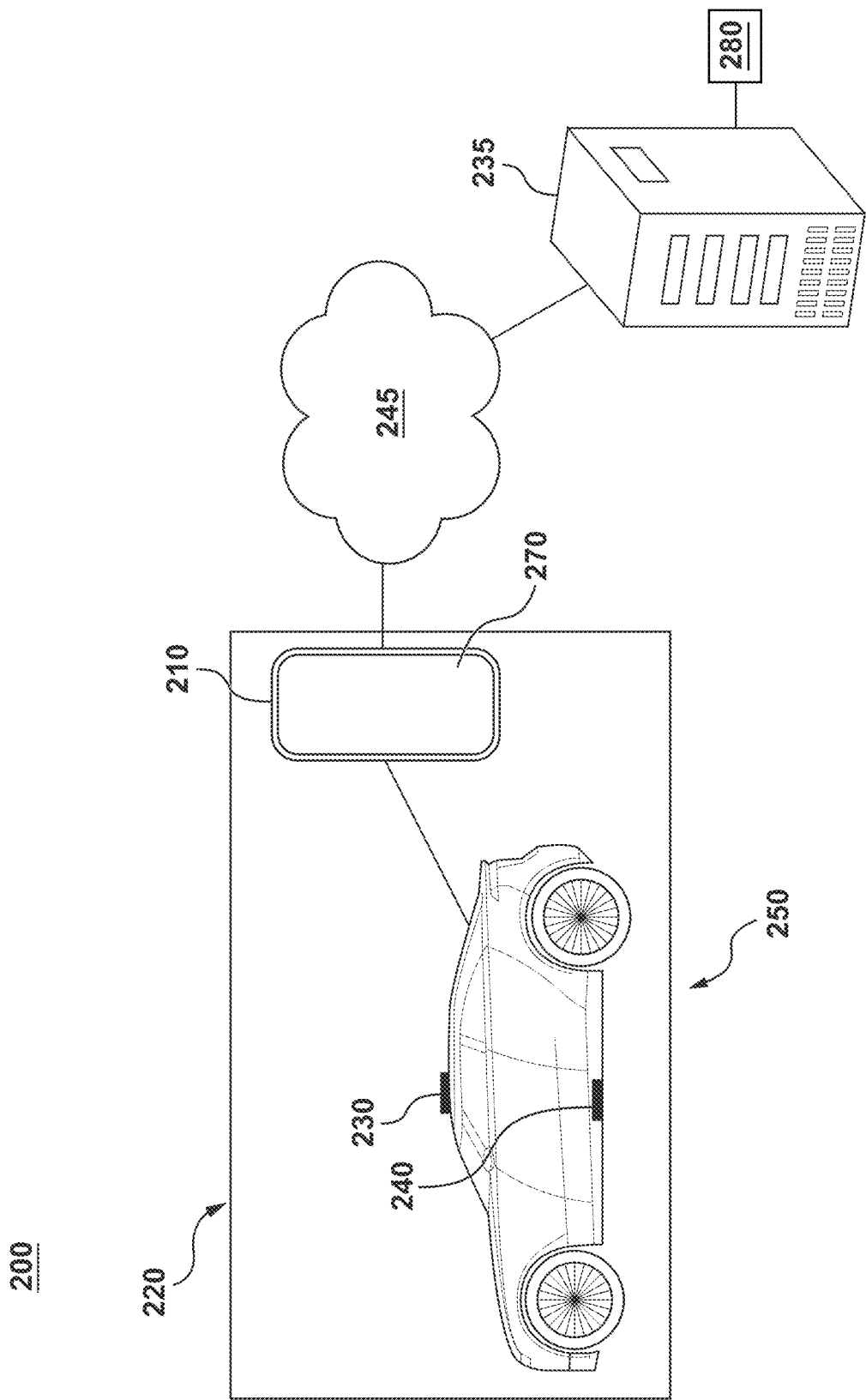
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom' vehicle navigation device, Garmin™ vehicle navigation device), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, the solid-state drive 120 and the memory 130. In other words, the electronic device 210 comprises hardware and/or software and/or firmware, or a combination thereof, for determining the presence of an object around the vehicle 220, as will be described in greater detail below.

In accordance with the non-limiting embodiments of the present technology, the electronic device 210 further comprises or has access to: a first sensor 230 configured to capture an image of a surrounding area 250 and a second sensor 240 configured to capture a 3D point cloud data of the surrounding area 250. The first sensor 230 and the second sensor 240 are operatively coupled to the processor 110 for transmitting the so-captured information to the processor 110 for processing thereof, as will be described in greater detail herein below.

In a specific non-limiting example, the first sensor 230 comprises a camera. How the camera is implemented is not particularly limited. For example, in one specific non-limiting embodiments of the present technology, the camera can be implemented as a mono camera with resolution sufficient to detect objects at a pre-determined distances of up to about 30 m (although cameras with other resolutions and ranges are within the scope of the present disclosure). The camera can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the first sensor 230 can be mounted in a dedicated enclosure (not depicted) mounted on the top of the vehicle 220.

In some non-limiting embodiments of the present technology, the first sensor 230 can be implemented as a plurality of cameras. For example, the plurality of cameras may have a sufficient number of cameras to capture a surrounding/panoramic image of the surrounding area 250.

In some embodiments of the present technology, the camera (or one or more cameras that make up the implementation of the first sensor 230) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other embodiments of the present technology, the camera is configured to capture an image (or a series of images) that represent approximately 180 degrees of the surrounding area 250 around the vehicle 220 that are along a movement path of the vehicle 220. In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the first sensor 230 can be implemented as the camera may be of the type available from FLIR Integrated Imaging Solutions Inc., 12051 Riverside Way, Richmond, BC, V6 W 1K7, Canada. It should be expressly understood that the first sensor 230 can be implemented in any other suitable equipment.

In a specific non-limiting example, the second sensor 240 comprises a Light Detection and Ranging (LIDAR) instrument (or LIDAR for short). Lidar stands for LIght Detection and Ranging. It is expected that a person skilled in the art will understand the functionality of the LIDAR instrument, but briefly speaking, a transmitter (not depicted) of the second sensor 240 implemented as the LIDAR sends out a laser pulse and the light particles (photons) are scattered back to a receiver (not depicted) the second sensor 240 implemented as the LIDAR instrument. The photons that come back to the receiver are collected with a telescope and counted as a function of time. Using the speed of light ($\sim 3 \times 10^8$ m/s), the processor 110 can then calculate how far the photons have traveled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the second sensor 240 can be implemented as the LIDAR based sensor that may be of the type available from Velodyne LiDAR, Inc. of 5521 Hellyer Avenue, San Jose, Calif. 95138, United States of America. It should be expressly understood that the second sensor 240 can be implemented in any other suitable equipment.

In some embodiments of the present technology, the second sensor 240 can be implemented as a plurality of LIDAR based sensors, such as three for example or any other suitable number. In some embodiments of the present technology, the second sensor 240 (whether implemented as a single LIDAR based sensor or multiple LIDAR based sensors) can be housed in the above-mentioned enclosure (not separately depicted) located on the roof of the vehicle 220.

In those embodiments of the present technology, where the second sensor 240 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the vehicle 220 is to be used (such as frequent rain, snow, and other elements) or the like.

In some embodiments of the present technology, the first sensor 230 and the second sensor 240 are calibrated such that for the image captured by the first sensor 230 and the 3D point cloud captured by the second sensor 240, the processor 110 is configured to identify a given region of the image that correspond to a given region of the 3D point cloud. This calibration can be executed during the manufacturing and/or set up of the vehicle 220. Or at any suitable time thereafter or, in other words, the calibration can be executed during retrofitting the vehicle 220 with the first sensor 230 and the second sensor 240 in accordance with the non-limiting embodiments of the present technology contemplated herein. Alternatively, the calibration can be executed during equipping the vehicle 220 with the first sensor 230 and the second sensor 240 in accordance with the non-limiting embodiments of the present technology contemplated herein.

In some non-limiting embodiments of the present technology, the vehicle 220 can include additional sensors (not depicted), such as radars and the like.

In some embodiments of the present technology, the communication network 245 is the Internet. In alternative non-limiting embodiments, the communication network 245 can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

In some embodiments of the present technology, the server 235 is implemented as a conventional computer server and may comprise some or all of the components of the computer system 1 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In the description provided herein, when certain processes and method steps are executed by the processor 110 of the electronic device 210, it should be expressly understood that such processes and method steps can be executed solely by the processor 110, in a shared manner (i.e. distributed) between the processor 110 and the server 235, or solely by the server 235. In other words, when the present description refers to the processor 110 or the electronic device 210 executing certain processes or method steps, it is to expressly cover processes or steps executed by the processor 110, by the server 235, or jointly executed by the processor 110 and the server 235.

Figure 3:
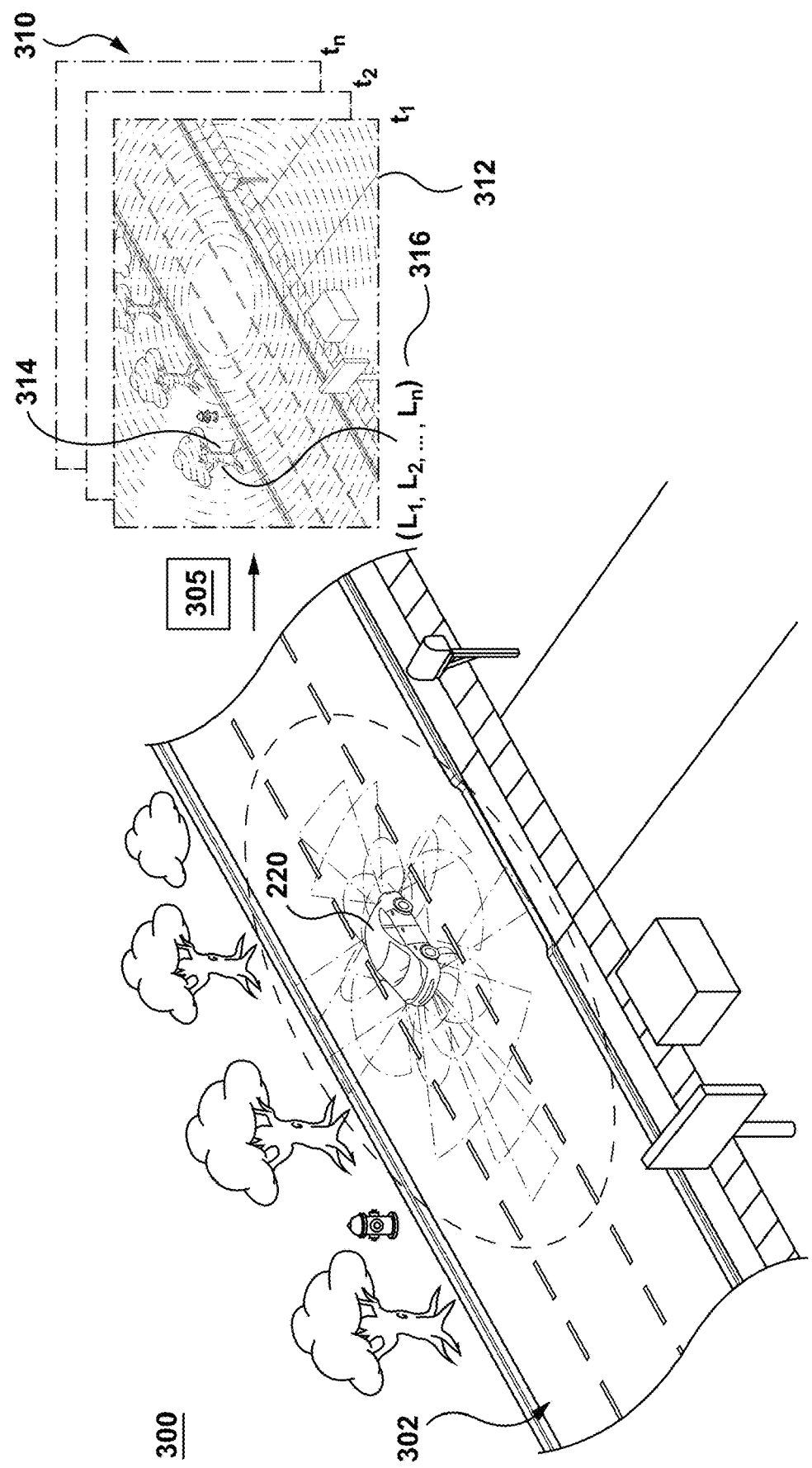
FIG. 3 depicts a LIDAR data acquisition procedure executed by a processor of an electronic device of the networked computing environment of FIG. 2, the procedure for receiving the 3D point cloud data 310 captured by a sensor of a vehicle present in the networked computing environment of FIG. 2.

With reference to FIG. 3, there is depicted a process 300 (also referred to as a LIDAR data acquisition procedure 300), executed by the processor 110, for receiving the 3D point cloud data 310 captured by the second sensor 240.

In some non-limiting embodiments of the present technology, the process of receiving the 3D point cloud data 310 can be executed in a continuous manner. In other embodiments of the present technology, the process of receiving the 3D point cloud data 310 can be implemented at pre-determined intervals, such every 2 milliseconds or any other suitable time interval.

To execute the LIDAR data acquisition procedure 300, as the vehicle 220 travels on a road 302, the electronic device 210 is configured to acquire with the second sensor 240 sensor data 305 representative of objects in the surrounding area 250 of the vehicle 220. The vehicle 220 travels on the road 302, and the electronic device 210 is configured to cause the second sensor 240 to acquire data about the surrounding area 250 of the vehicle 220 at different locations on the road 302.

The electronic device 210 receives the sensor data 305 representative of objects in the surrounding area 250 of the vehicle 220 at different locations on the road 302 in the form of LIDAR point cloud 312.

Generally speaking, the LIDAR point cloud 312 is a set of LIDAR points in the form of a 3D point cloud, where a given LIDAR point 314 is a point in 3D space indicative of at least a portion of a surface of a given object on or around the road 302. In some non-limiting embodiments of the present technology, the LIDAR point cloud 312 may be organized in layers, where points in each layer are also organized in an elliptical fashion and the starting points of all elliptical layers are considered to share a similar orientation.

The given LIDAR point 314 in the LIDAR point cloud 312 is associated with LIDAR parameters 316 (depicted in FIG. 3 as $L_1$, $L_2$, and $L_N$). As a non-limiting example, the LIDAR parameters 316 may include: distance, intensity, and angle, as well as other parameters relating to information that may be acquired by a second sensor 240. The second sensor 240 may acquire a LIDAR point cloud at each time step t while the vehicle 220 is travelling, thereby acquiring a set of 3D point cloud data 310.

It is contemplated that in some non-limiting embodiments of the present technology, the vehicle 220 can also acquire images with the first sensor 230 and enrich the LIDAR point cloud 312 with the image data obtained from the first sensor 230. The process for enriching LIDAR point cloud 312 with the image data obtained by the first sensor 230 is described in a co-owned patent application entitled METHODS AND SYSTEMS FOR COMPUTER-BASED DETERMINING OF PRESENCE OF OBJECTS, filed on Mar. 29, 2019, and being published in U.S. Patent Publication No. 2020/0090352 on Mar. 19, 2020; the content of which is hereby incorporated by reference in its entirety.

Figure 4:
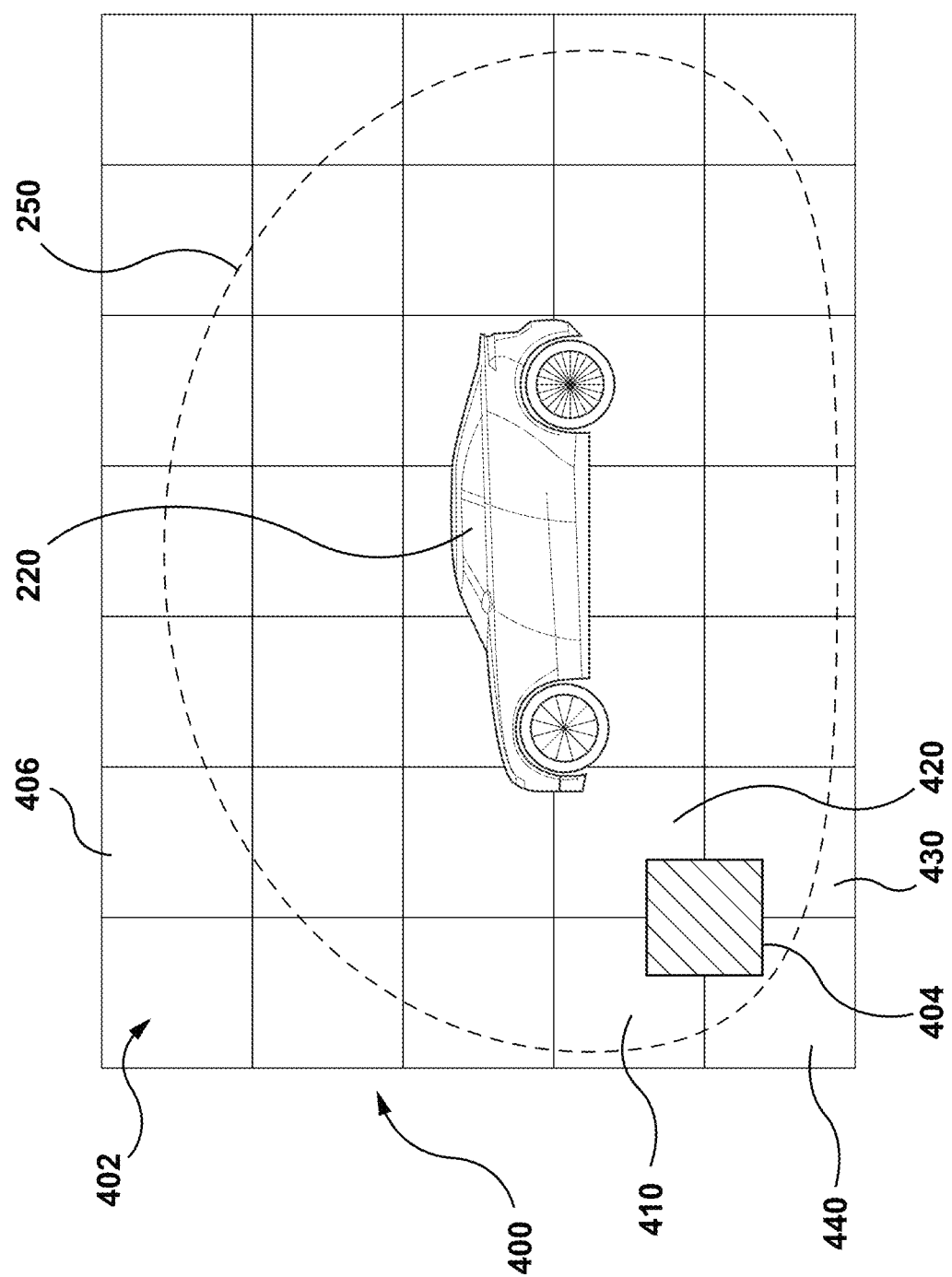
FIG. 4 depicts a grid representation data acquisition procedure, executable by the processor of the electronic device of the networked computing environment of FIG. 2, the procedure for receiving the grid representation data of the surrounding area 250 around the vehicle present in the networked computing environment of FIG. 2.

With reference to FIG. 4, there is depicted a schematic representation of a grid 400, implemented in accordance with the non-limiting embodiments of the present technology. In FIG. 4, the grid 400 is depicted as overplayed over the surrounding area 250 around the vehicle 220. In some non-limiting embodiments of the present technology, the grid 400 is centered on the vehicle 220 and moves with the vehicle 220 as the vehicle 220 moves along the road 302.

In some embodiments of the present technology, the process of obtaining the grid 400 is in a continuous or a substantially continuous manner. For example, the process of obtaining the grid 400 can be executed as often as permitted by physical constraints (such as processing speed) of the electronic device 210. In other non-limiting embodiments of the present technology, the process of obtaining the grid 400 can be executed at pre-determined time intervals, such as for example, every 2 ms, every 5 ms, or the like.

In some non-limiting embodiments of the present technology, the grid 400 contains information about other objects located in the surrounding area 250. In FIG. 4, a single instance of an other object 404 is depicted. In some non-limiting embodiments of the present technology, the other object 404 can be a static object, or in other words, an object that does not move (or is not intended to be moved). In other words the other object 404 can be stationary that the vehicle 220 moves relative to, but which does not move relative to the Earth.

An example of the other object 404 that is stationary includes (but is not limited to): a house, an apartment building, a tree, a fence, a raised side walk, a multi-lane road raised divider, a parked vehicle, or the like. In some non-limiting embodiments of the present technology, the other object 404 (as an example of a plurality of other objects being potentially present in the surrounding area 250) can further include a movable (i.e. a non-static) object.

In some non-limiting embodiments of the present technology, the grid 400 comprises an occupancy grid. Broadly speaking, the occupancy grid is a discretization of a road environment data into fixed-sized cells, each of which contains an indication of a probability the given cell is occupied. The occupancy grid is a basic data structure that is used as an alternative to storing full point clouds, for example.

In accordance with the non-limiting embodiments of the present technology, the grid 400 comprises a plurality of cells 402. A given cell 406 of the plurality of cells 402 is associated with a cell size. In a specific non-limiting embodiment of the present technology, the cell size of the given cell 406 can represent an area of 20 cm×20 cm. However, it should be noted that in alternative non-limiting embodiments of the present technology, the size of the given cell 406 of the plurality of cells 402 can be different, such as smaller or larger (for example, 5 cm×5 cm, 50 cm×50 cm, 1 m×1 m, or the like).

In accordance with the non-limiting embodiments of the present technology, the given cell 406 (as well as other cells of the plurality of cells 402) stores an indication of a distance to a closest object (in this example, the other object 404). In a specific non-limiting embodiment of the present technology, the indication of the distance to the closest object is implemented as an indication of a distance to a closest cell with the predicted presence of the other project 404. In some specific non-limiting embodiments of the present technology, the indication of the distance to the closest object is implemented as a predicted distance as generated by a Machine Learning Algorithm (MLA) 280 (depicted in FIG. 2), having been trained by the server 235 and executed by the processor 110 of the electronic device 210.

It is noted that in the illustrated embodiment of FIG. 4, the other object 404 is associated with a first cell 410, a second cell 420, a third cell 430, and a fourth cell 440. In other words, it can be said that if the points of the 3D cloud point data generated by the second sensor 240 were generated representative of the surrounding area 250, the points associated with the other object 404 would be located in at least the first cell 410, the second cell 420, the third cell 430, and the fourth cell 440.

Figure 5:
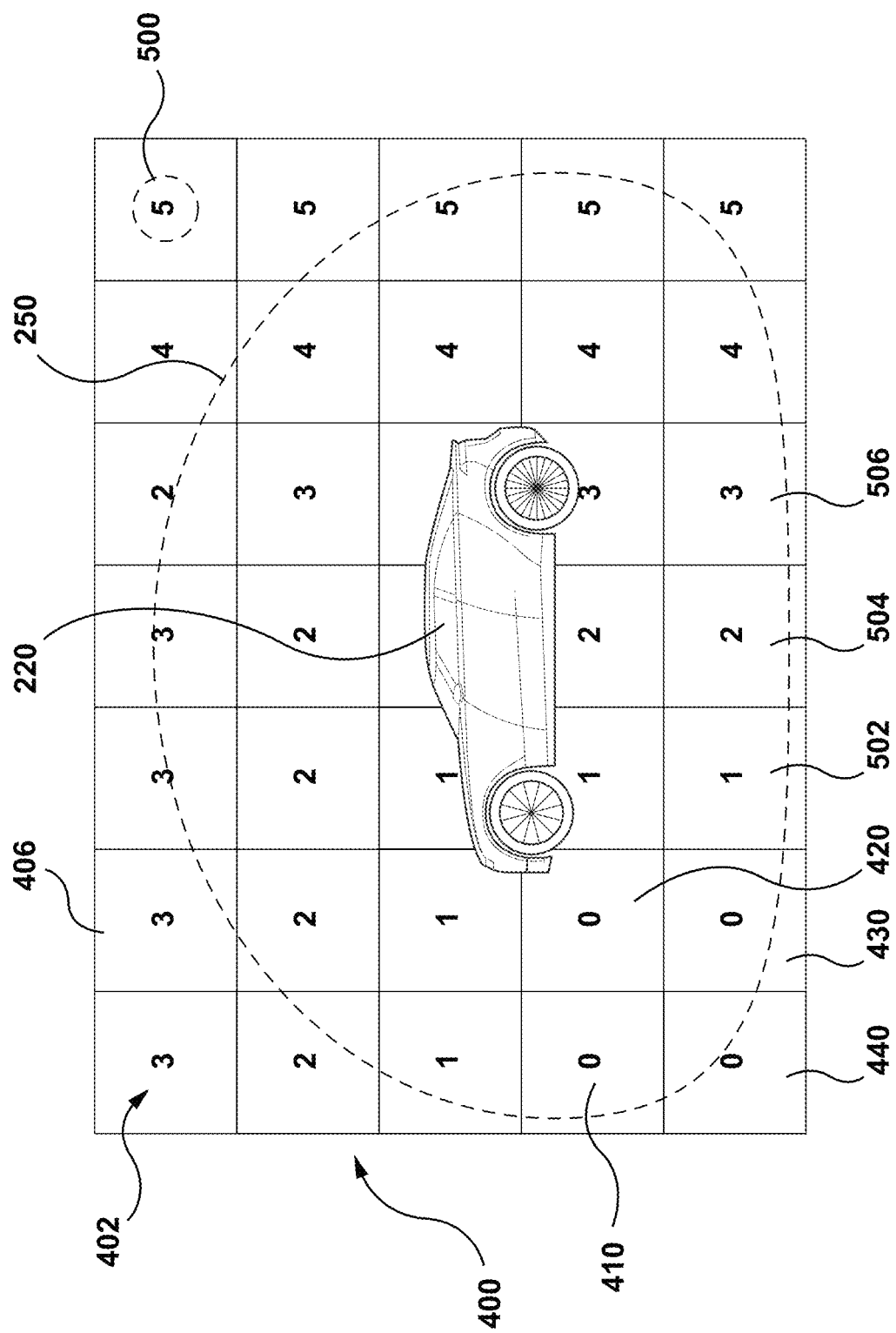
FIG. 5 depicts a grid representation used by the processor of the electronic device of the networked computer environment of FIG. 2 for determining a presence of an object in the surrounding area 250 around the vehicle present in the networked computer environment of FIG. 2, in accordance with the non-limiting embodiments of the present technology.

As best illustrated in FIG. 5, each given cell 406 of the plurality of cells 402 is populated with an obstruction-distance parameter 500 indicative of the distance to the closest object (the other object 404, for example). Thus, in some non-limiting embodiments of the present technology, the obstruction-distance parameter 500 represents a distance to the closest cell with an object, such as the other object 404. In the depicted embodiment, the distance is represented in an indication of a number of cells that are between the current cell and the cell (which can be one of a plurality of cells) in which the other object 404 is located.

As such, the value of the obstruction-distance parameter 500 of the first cell 410, the second cell 420, the third cell 430, and the fourth cell 440 is zero. In other words, the value of the obstruction-distance parameter 500 of the first cell 410, the second cell 420, the third cell 430, and the fourth cell 440 is representative of a distance to the closest cell with an object is zero or, in other words, that the first cell 410, the second cell 420, the third cell 430, and the fourth cell 440 themselves contain the object (i.e. the other object 404).

By the same token, a cell located next to one of the first cell 410, the second cell 420, the third cell 430, and the fourth cell 440 (such as illustrated by a given cell 502), has the value of the obstruction-distance parameter 500 one (1) indicative of the distance to the cell with the object (i.e. the other object 404) being one cell. By the same token, a cell located next to one of the cells located next to the first cell 410, the second cell 420, the third cell 430, and the fourth cell 440 (such as illustrated by a given cell 504), has the value of the obstruction-distance parameter 500 two (2) indicative of the distance to the cell with the object (i.e. the other object 404) being two cells. As another example, a another cell located next to cells mentioned in the previous sentence having the distance two (2), such as a given cell 506, for example, has the value of the obstruction-distance parameter 500 three (3) indicative of the distance to the cell with the object (i.e. the other object 404) being three cells.

It should be noted that how the value of the obstruction-distance parameter 500, expressed in a number of cells to the closest cell with an object, is calculated, in terms of a number of cells, is not particularly limited. For example, it can be indicative of a shortest path to the closest cell with the object, be it in straight line (left, right top, bottom), diagonally, or a combination of the two.

Even though in the depicted example, the value of the obstruction-distance parameter 500 is expressed in a number of cells to the closest cell with an object, this does not need to be so in every non-limiting embodiment of the present technology. In alternative non-limiting embodiments of the present technology, the obstruction-distance parameter 500 can be expressed as distance in meters, or the like.

As alluded to hereinabove, in some non-limiting embodiments of the present technology, a respective value of the obstruction-distance parameter 500 is generated, for each cell of the grid representation 400, by the processor 110 executing the MLA 280 as will be further described with reference to FIGS. 6 to 10.

In the non-limiting embodiments of the present technology, the MLA 280 may be based on neural networks (NN), convolutional neural networks (CNN), decision tree models, gradient boosted decision tree based MLA, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like. For training the MLA 280, the server 235 may employ a supervised-learning approach without departing from the scope of the present technology.

Generally speaking, the server 235 and/or the processor 110 of the electronic device 210 can be said to be executing two respective processes in respect of the MLA 280. A first process of the two processes is a training process, executed by the server 235 and/or the processor 110 of the electronic device 210, where the server 235 is configured to train the MLA 280, based on a training set of data, to determine a presence of an object in the surrounding area 250 of the vehicle 220. A second process is an in-use process, executed by the server 235 and/or the processor 110 of the electronic device 210, where the processor 110 executes the so-trained MLA 280 for determining a presence of an obstacle in the surrounding area 250 of the vehicle 220, in accordance with the non-limiting embodiments of the present technology.

According to the non-limiting embodiments of the present technology, both the training process and the in-use process may be executed by the server 235 and/or the processor 110 of the electronic device 210 in the networked computing environment 200 described hereinabove with reference to FIG. 2.

In the non-limiting embodiments of the present technology, the MLA 280 comprises two models: a first model (for example, a first model 700 described below with reference to FIG. 7) and a second model (for example, a second model 900 described below with reference to FIG. 9). Accordingly, the server 235 and/or the processor 110 of the electronic device 210 may be configured to train both the first model 700 and the second model 900 based on one set of training data. However, it is also contemplated that separate training sets may be used.

Training Process

As mentioned above the server 235 is configured to train the MLA 280 based on the training set of data, the process of generating of which will be now described. The description presented below can apply mutatis mutandis to the embodiment where the processor 110 of the electronic device 210 executes the training.

Referring back to FIG. 2, according to the non-limiting embodiments of the present technology, the processor 110 is configured to receive a training sensor data (not depicted), for example, from the second sensor 240 of the vehicle 220. As mentioned above, the training sensor data may be received in a form of a 3D point cloud data (a training 3D point cloud data 602 described below with reference to FIG. 6, for example) comprising a plurality of training LIDAR point clouds representative of objects located in the surrounding area 250 of the vehicle 220, and generated, by the second sensor 240, at different moments in time.

Figure 6:
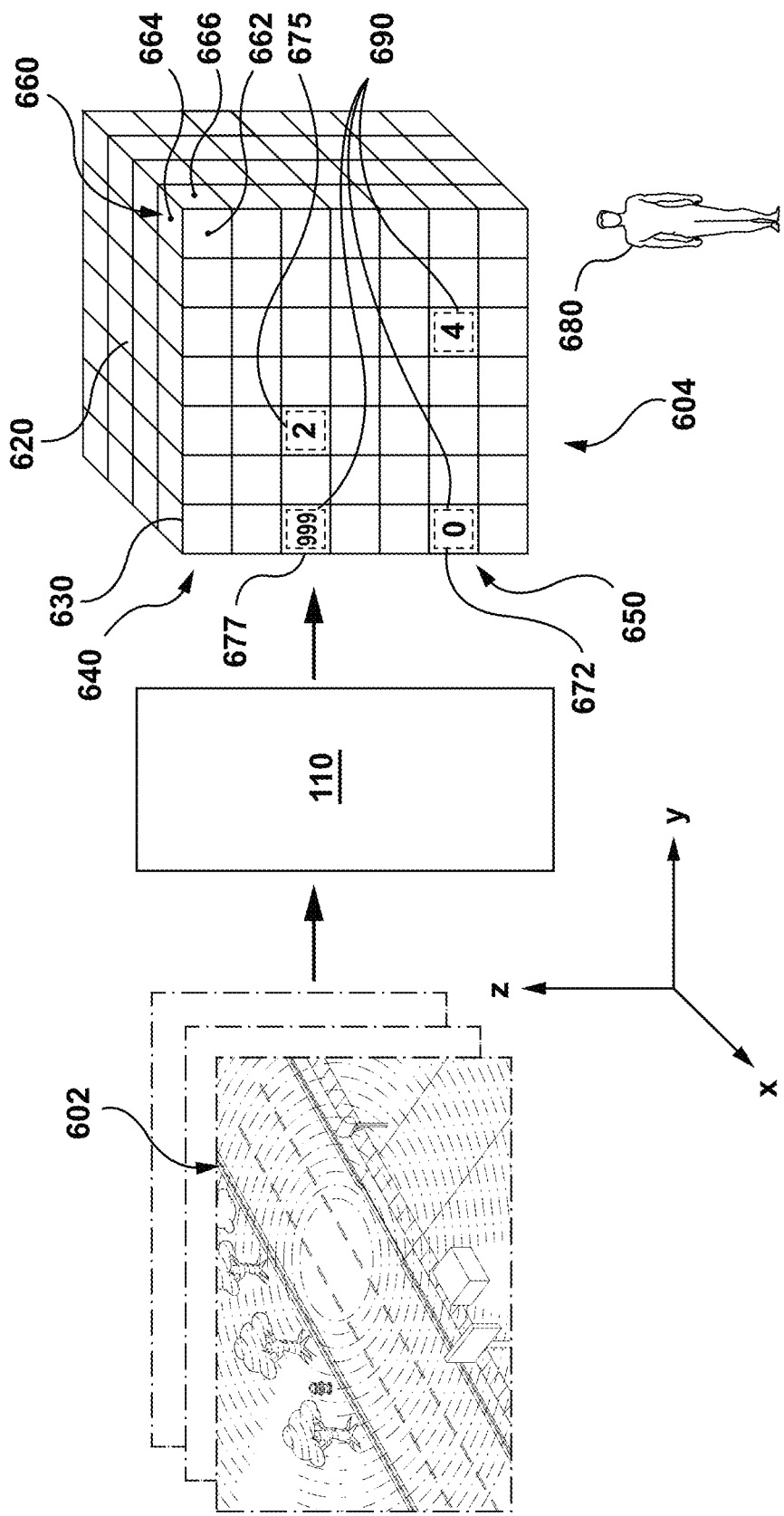
FIG. 6 depicts a process for pre-processing, by the processor of the electronic device of the networked computer environment of FIG. 2, a training 3D point cloud data, generated by a second sensor mounted onto the vehicle of FIG. 2 as part of a training an MLA run by a server of the networked computer environment of FIG. 2, in accordance with the non-limiting embodiments of the present technology.

With reference now to FIG. 6, there is depicted a process for pre-processing the training 3D point cloud data 602 for generating the training set of data for training the MLA 280, in accordance with the non-limiting embodiments of the present technology. In this regard, the training 3D point cloud data 602 includes at least one 3D scene of the surrounding area 250 of the vehicle 220.

In the non-limiting embodiments of the present technology, the processor 110 of the electronic device 210 is configured to apply a 3D grid 620 onto the training 3D point cloud data 602, thereby generating a pre-processed training 3D point cloud data 604.

The 3D grid 620 is associated with a horizontal step 630 and a vertical step 640. The horizontal step 630 can be, for example, 10 cm. In some non-limiting embodiments of the present technology, the size of the horizontal step 630 is selected to find a balance between efficiency of processing and accuracy of the output. For example, a smaller value for the horizontal step 630 will lead to better accuracy, but slower processing speed (given the same processing power of the processor 110). By the same token, a larger value for the horizontal step 630 will lead to less accurate outcome, but faster processing speed (given the same processing power of the processor 110). The exact value for the horizontal step 630 can be determined by an operator of the server 235 (not separately numbered).

In specific non-limiting embodiments of the present technology, the horizontal step 630 can be selected to correspond to the cell size of the given cell 406 of the grid 400 described above with reference to FIG. 4.

The vertical step 640 can be, for example, 0.5 meters. The exact value of the vertical step 640 can be selected, for example, by the operator of the server 235 based on several considerations. For example, a specific application of the methods and processes described herein. As an example, in those embodiments of the present technology, where the goal is to determine an object that can be an obstacle (such as a human, another vehicle or the like that are comparable in height to the vehicle 220), the vertical step 640 of 0.5 meters can be appropriate. In other embodiments of the present technology, where the goal is to determine an object that is closer to the ground (such as for example, a line marking, a curb, or the like), the vertical step 640 of 0.1 meters can be appropriate.

Thus, the pre-processed training 3D point cloud data 604 represents a 3D data structure having a plurality of cells 650 where each 3D point is associated with a respective cell. In the depicted embodiments, a given cell 660 of the plurality of cells 650 is associated with given points 662, 664, and 666. The processor 110 is then configured to transmit, via the communication network 245, the pre-processed training 3D point cloud data 604 to the server 235 for further processing.

Further, according to the non-limiting embodiments of the present technology, the server 235 may be configured to send the pre-processed training 3D point cloud data 604 to a human assessor 680. The human assessor 680 may then assign an assessor-generated label 690 to each of the plurality of cells 650.

It should be expressly understood that, according to the non-limiting embodiments of the present technology, the human assessor 680 may comprise a plurality of human assessors.

In the non-limiting embodiments of the present technology, each value of the assessor-generated label 690 assigned to a respective one of the plurality of cells 650 is indicative of a distance (in meters or in a number of cells, for example) between that cell and a closest thereto another cell of the plurality of cells 650 known to contain an obstacle therein.

For example, in the depicted embodiments of FIG. 6, a given cell 670 of the plurality of cells 650 has been assigned, by the human assessor 680, with the assessor-generated label 690 that has a value of four (4), which is to mean that the closest, to the given cell 670 of the plurality of cells 650, cell containing an obstacle therein, i.e. a cell 672, is located 4 cells away from the given cell 670. Accordingly the cell 672 has been assigned with the assessor-generated label 690 having a value of zero (0).

In some non-limiting embodiments of the present technology, the assessor-generated label 690 may have a value indicative of uncertainty of whether another given one of the plurality of cells 650 contains an obstacle or not—for example, it can be a pre-determined constant, such as '999' (other data types can also be used, for example, symbolic or string constants). The assessor 680 may use that value of the assessor-generated label 690 when he or she, based on the provided pre-processed training 3D point cloud data 604, cannot confidently conclude if the other given cell contains the obstacle or not. In other words, the obstacle contained in the other given cell may be obscured by another object (static or dynamic), or the obstacle may be shaded.

Thus, in the depicted embodiments of FIG. 6, a cell 677 of the plurality of cells 650 has been assigned with the assessor-generated label 690 having a value of the predetermined constant '999' which is to mean that the provided pre-processed training 3D point cloud data 604 was not sufficient, to the human assessor 680, to firmly conclude if the cell 677 contained an obstacle therein or not. As such, the cell 677 is considered to potentially contain the obstacle therein. Therefore, a cell 675, for which the closest cell of the plurality of cells 650 potentially containing the obstacle is the cell 677, is labelled with the assessor-generated label 690 having a value of two (2).

By so doing, the human assessor 680 labels each cell of the plurality of cells 650 of the pre-processed 3D point cloud data 604; and the so-labelled pre-processed training 3D point cloud data 604 is further processed by the server 235.

First Model

Figure 7:
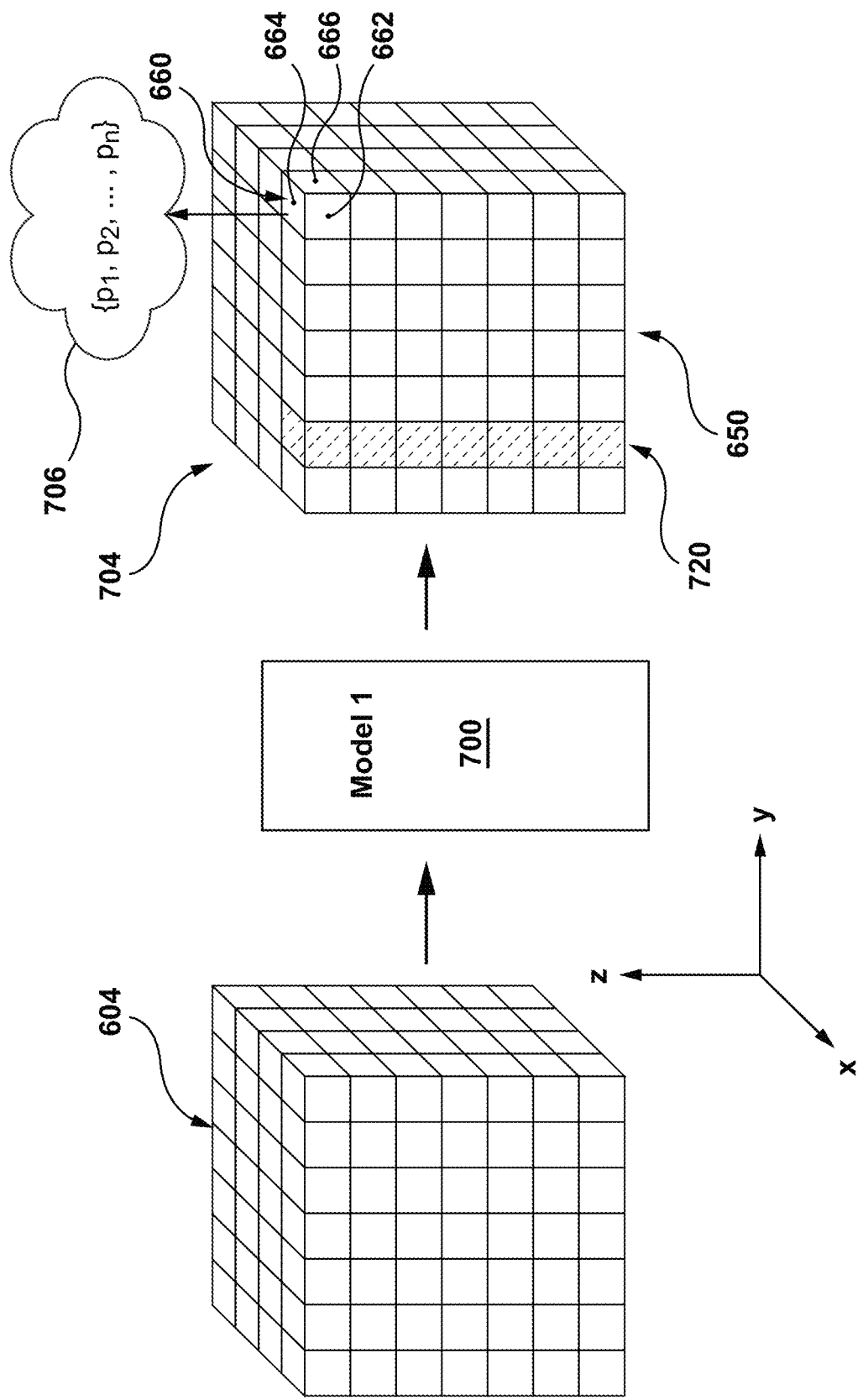
FIG. 7 depicts a schematic diagram of a process for generating, by a first model of the MLA run by the server of the networked computer environment of FIG. 2, a 3D tensor, based on the pre-processed training 3D point cloud data of FIG. 6 as part of the training the MLA run by the server of the networked computer environment of FIG. 2, in accordance with the non-limiting embodiments of the present technology.

With reference to FIG. 7, there is depicted a process of generating, by the first model 700, a 3D tensor 704 based on the pre-processed training 3D point cloud data 604, according to the non-limiting embodiments of the present technology. Broadly speaking, the first model 700 is configured, by the server 235, to generate, for each cell of the plurality of cells 650, a feature vector representative of points associated therewith.

For example, in the depicted embodiments, a given feature vector 706 $\{p_1, p_2, \ldots, p_n\}$ is representative of the given points 662, 664, and 666 associated with the given cell 660 of the plurality of cells 650, where $p_1, p_2, \ldots, p_n$ is a plurality of features describing the given points 662, 664, and 666.

In some non-limiting embodiments of the present technology, the plurality of features $p_1, p_2, \ldots, p_n$ of the given feature vector 706 may further include geometrical features that may be indicative, for example, of spatial position of each of the given points 662, 664, and 666 relative to each other in a space of the associated given cell 660.

In additional non-limiting embodiments of the present technology, the plurality of features $p_2, \ldots, p_n$ of the given feature vector 706 may further include features indicative of geometrical position of each of the given points 662, 664, and 666 associated with the given cell 660 in the pre-processed training 3D point cloud data 604. For example, the geometrical position of each of the given points 662, 664, and 666 may be represented by their Cartesian coordinates (x, y, z) in the pre-processed training 3D point cloud data 604.

In yet other non-limiting embodiments of the present technology, the plurality of features $p_1, p_2, \ldots, p_n$ of the given feature vector 706 may include additional features, such as features indicative of light intensity of each of the given points 662, 664, and 666.

Thus, in the non-limiting embodiments of the present technology, as the given feature vector 706 describes, based on the plurality of features $p_1, p_2, \ldots, p_n$ each of the given points 662, 664, and 666 associated with the given cell 660, the server 235 is configured to associate the given feature vector 706 with the given cell 660 of the plurality of cells 650.

By generating, using the first model 700, a feature vector for each of the plurality of cells 650, the server 235 is whereby configured to generate the 3D tensor 704 based on the pre-processed training 3D point cloud data 604. Each element of the tensor 704 corresponds to a respective one of the plurality of cells 650 of the pre-processed 3D point cloud data 604, and is associated with a respective feature vector generated by the first model 700.

In specific non-limiting embodiments of the present technology, the first model 700 is a CNN implemented with a PointNet architecture.

In the non-limiting embodiments of the present technology, the server 235 is further configured to generate a plurality of amalgamated vectors based on feature vectors associated with cells of a respective column of the 3D tensor 704. How an amalgamated vector, for a given column 720 of the 3D tensor, is generated will be now described with reference to FIG. 8.

Figure 8:
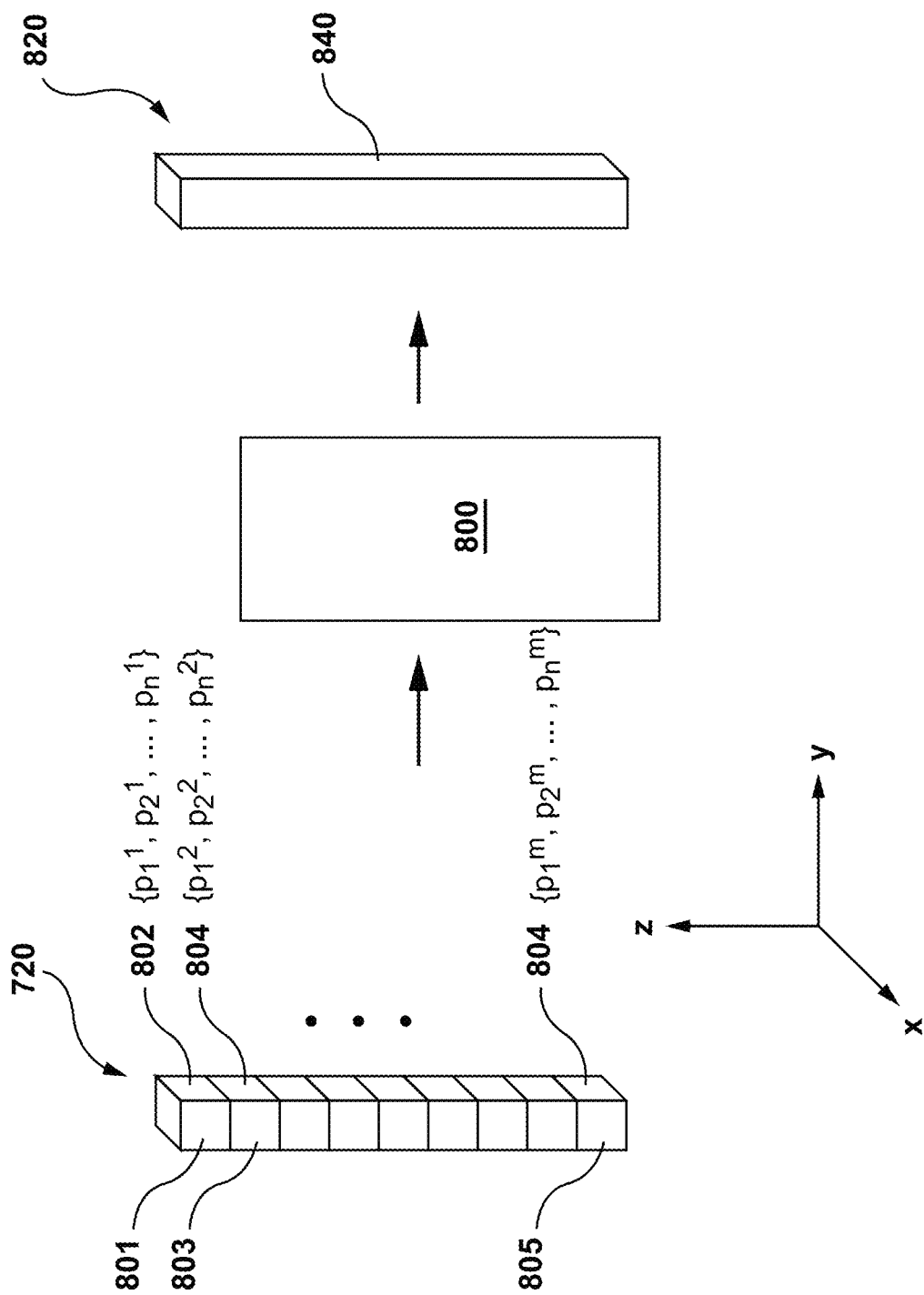
FIG. 8 depicts a schematic diagram of a process for generating, by the server 235 of the networked computer environment of FIG. 2, based on a column of the 3D tensor of FIG. 7, an amalgamated vector, in accordance with the non-limiting embodiments of the present technology.

With reference to FIG. 8, there is depicted a process for generating an amalgamated vector 820 based on the given column 720 of the 3D tensor 704, according to the non-limiting embodiments of the present technology.

In the embodiments of FIG. 8, each cell of the given column 720 of the 3D tensor 704 is associated with a respective feature vector. For example, a cell 801 is associated with a feature vector 802 $\{p_1^1, p_2^1, \ldots, p_n^1\}$, a cell 803 is associated with a feature vector 804 $\{p_1^2, p_2^2, \ldots, p_n^2\}$, and a cell 805 is associated with a feature vector 806 $\{p_1^m, p_2^m, \ldots, p_n^m\}$, where $p_i^j$ is a value of a respective feature included in respective feature vectors associated with the cells of the given column 720.

In the non-limiting embodiments of the present technology, in order to generate the amalgamated vector 820, the server 235 is configured to apply an amalgamating procedure 800.

Broadly speaking, the amalgamating procedure 800 comprises a mathematical model configured to combine, over the given column 720, information contained in the associated cells 801, 803, . . . , 805.

For example, the amalgamating procedure 800 may be configured to concatenate (as an example, but other processing operations can be used as well) each feature vector 802, 804, . . . , 806 of the associated cells 801, 803, . . . , 805. Consequently, the amalgamating procedure 800 outputs the amalgamated vector 820 as follows:

$$\{p_1^1, p_2^1, \ldots, p_n^1, p_1^2, p_2^2, \ldots, p_n^2, p_1^m, p_2^m, \ldots, p_n^m\}$$ (Equation 1)

It should be noted that the non-limiting embodiments of the present technology are based on a premise that the data represented by each of the feature vector associated with the given column 720 are homogeneous over the given column 720, which allows for a broader range of processing operations applicable by the amalgamating procedure 800 for generating the amalgamated vector 820, such as summing, averaging, or the like.

Following the process described above with reference to FIG. 8, the server 235 is configured to generate, for each of the column of the 3D tensor 704, a corresponding amalgamated vector, thereby generating a modified 3D tensor 904 (for example, a modified 3D tensor 904 described below with reference to FIG. 9). Thus, each element of the modified tensor 904 is an amalgamated vector comprising data derived from respective feature vectors associated with respective cells of an associated column of the 3D tensor 704.

Second Model

Figure 9:
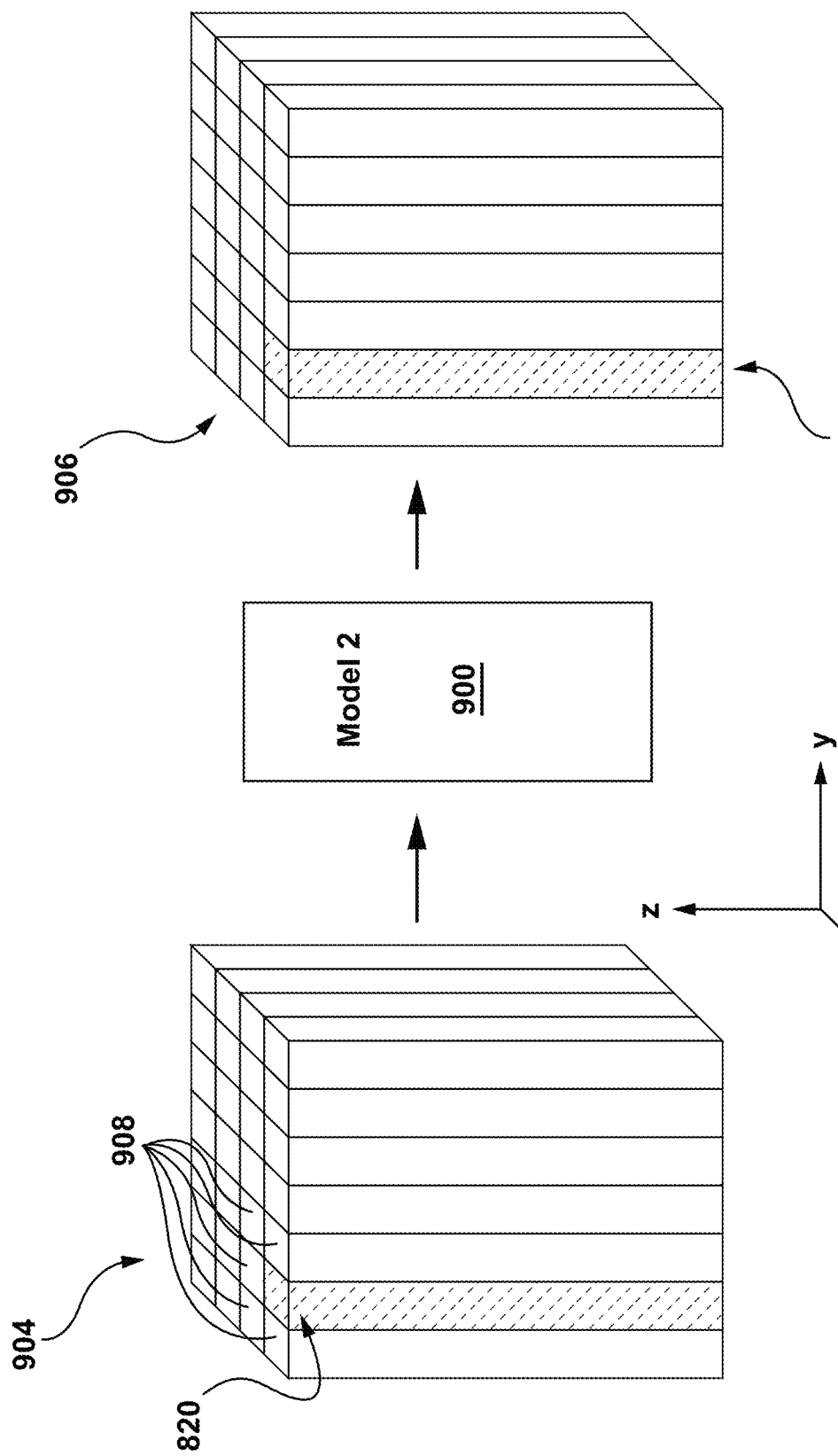
FIG. 9 depicts a schematic diagram of a process for generating, by a second model of the MLA run by the server of the networked computer environment of FIG. 2, a convolved 3D tensor based on a plurality of a tensor comprising a plurality of amalgamated vectors of FIG. 8, in accordance with the non-limiting embodiments of the present technology.

With reference to FIG. 9, there is depicted a process for generating, by the second model 900, a training convolved 3D tensor 906, according to the non-limiting embodiments of the present technology.

In the non-limiting embodiments of the present technology, the second model 900 is configured to generate the training convolved 3D tensor 906 by convolving each element of the modified 3D tensor 904 with each other. In a sense, when processing the given amalgamated vector 820 of the modified 3D tensor 904, the second model 900 "looks" at neighbouring amalgamated vectors, for example, at one of a plurality of neighbouring amalgamated vectors 908, to identify common features thereamong. By so doing, the second model 900 is configured to generate, based on the amalgamated vector 820 and the plurality of neighbouring amalgamated vectors 908, a respective element 920 of the training convolved tensor 906.

The respective element 920 of the training convolved 3D tensor 906 is characterized by spatial coordinates (x, y, z), where (x, y) are planar Cartesian coordinates of a base of the respective element 920, and z is indicative of a distance between the respective element 920 and a closest one thereto containing an obstacle.

The so-generated training convolved 3D tensor 906 may be represented in a 2D form, thereby forming a training grid (not depicted), similar to the grid 400 depicted in FIGS. 4 and 5. As such, each cell of the training grid (not depicted) is characterized by its planar Cartesian coordinates and a parameter indicative of a distance to a closest cell containing an obstacle, the parameter being associated with a respective value of the assessor-generated label 690.

In specific non-limiting embodiments of the present technology, the second model 900 is a CNN with an encoder-decoder architecture. In these embodiments, the second model 900 may be, for example, a U-Net model.

It should be expressly understood that, according to the non-limiting embodiments of the present technology, the server 235 may be provided with the training 3D point cloud data 602 comprising data of a plurality of 3D scenes (such as hundreds, thousands, or hundreds of thousands) generated by the second sensor 240, for each of which the server 235 is configured to perform the training process as described above with reference to FIGS. 6 to 9, thereby training both the first model 700 and the second model 900, i.e. the MLA 280, for determining the obstruction-distance parameter 500 for each of the plurality of cells 402 of the grid 400

In-Use Process

According to the non-limiting embodiments of the present technology, the in-use process is executed by the processor 110 of the electronic device 210, whereby the processor 110 is configured to execute the so-trained MLA 280 for determining a presence of an object in the surrounding area 250 of the vehicle 220. However, description presented herein below can be applied mutatis mutandis to the implementations where the in-use process is executed by the server 235.

According to the non-limiting embodiments of the present technology, the in-use process is substantially similar to the training process described above, as the in-use process includes the stages of (i) pre-processing 3D point cloud data 310 using the 3D grid 620, (ii) generating, by the trained first model 700, feature vector for each of the plurality of cells 650, thereby generating a 3D tensor (not depicted) (iii) generating, based on columns of the 3D tensor, respective amalgamating vectors using amalgamating procedure 800, and (iv) generating, by the trained second model 900, a convolved 3D tensor. The only difference is that the in-use process does not include the labelling procedure as it was solely used to train the MLA 280 to determine presence of objects, which is done in the in-use process automatically, by the trained MLA, as will be now described with reference to FIG. 10.

Figure 10:
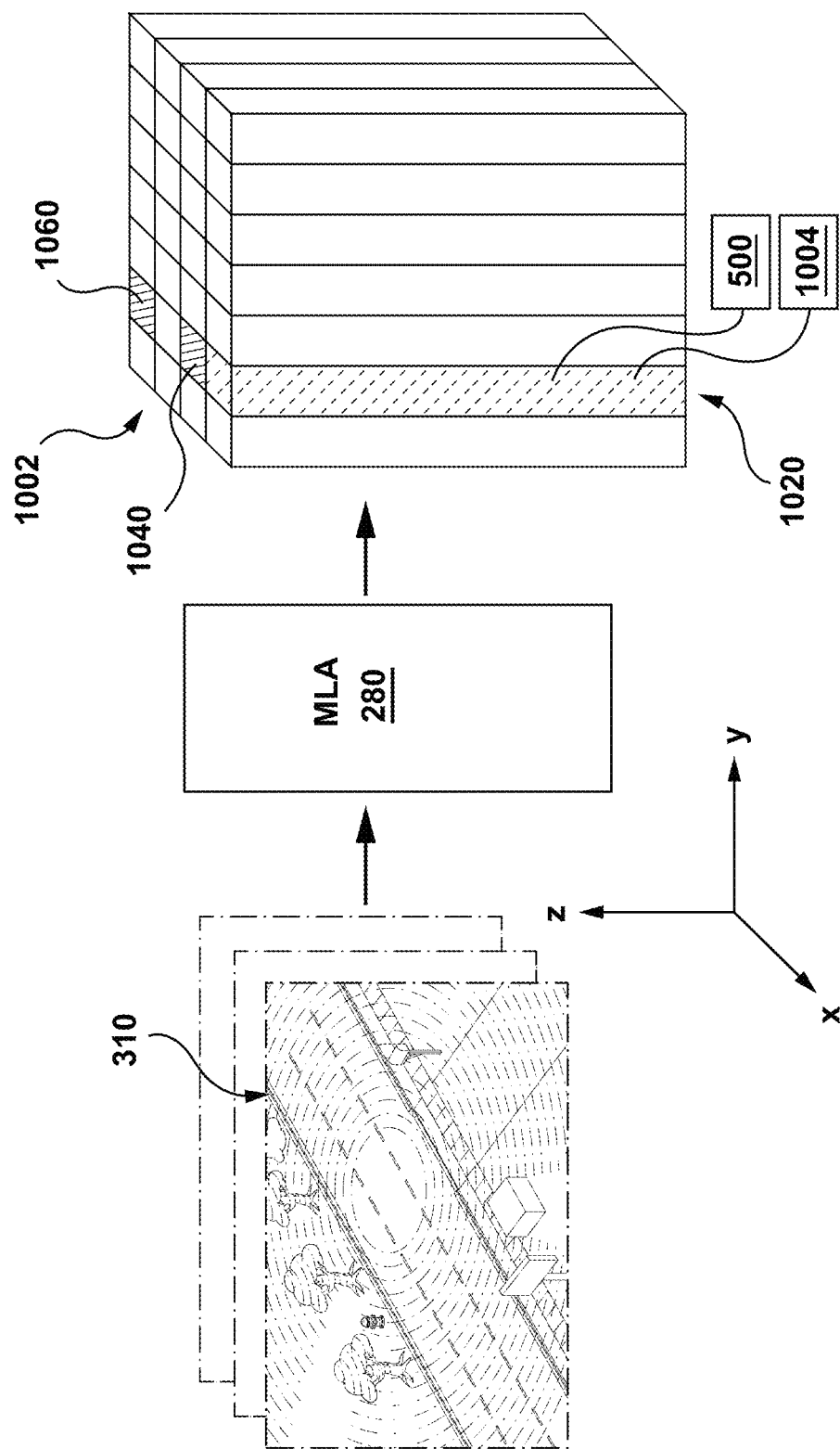
FIG. 10 depicts a schematic diagram of an in-use process of the MLA executed by the processor of the electronic device of the networked computer environment of FIG. 2, in accordance with the non-limiting embodiments of the present technology.

With the reference now to FIGS. 3 and 10, the processor 110 is configured to receive the sensor data 305 generated by the second sensor 240 in the form of the 3D pointy cloud data 310.

The processor 110 is configured to execute the trained MLA 280, thereby generating a convolved 3D tensor 1002. Further, the trained MLA 280 is configured to predict, for each element of the convolved 3D tensor, a value of the obstruction-distance parameter 500 and an associated value of a confidence level 1004.

In the non-limiting embodiments of the present technology, a given value of the confidence level 1004 is indicative of how accurately the MLA 280 has predicted an associated value of the obstruction-distance parameter 500. For example, values of the confidence level 1004 may vary between 0 and 1, where 0 means that the associated predicted value of the obstruction-distance parameter 500 is not reliable and may need to be discarded or re-calculated, for example. Accordingly, 1 means that the associated predicted value of the obstruction-distance parameter 500 is reliable and can be further used, by the processor 110, for determining a presence of an obstacle in the surrounding area 250 of the vehicle 200. Based on that determination, the processor 110 may further be configured to plan a trajectory of the vehicle 220 considering the determined obstacle.

In some non-limiting embodiments of the present technology, the processor 110 may apply a predetermined threshold value (0.7, for example) for the confidence level 1004 in such a way that all values of the obstruction-distance parameter 500 having associated values of the confidence level 1004 below the predetermined threshold value may be considered unreliable. Accordingly, all values of the obstruction-distance parameter 500 having associated values of the confidence level 1004 equal to or greater than the predetermined threshold value may be considered reliable.

Let it be assumed, for example, that in the depicted embodiments of FIG. 10, the trained MLA 280, has predicted, for a given element 1020 of the convolved 3D tensor 1002, respective values of the obstruction-distance parameter 500 and the confidence level '0' and '1'. This means that the processor 110, based on these values, determines an obstacle in the given element 1020. Further, the MLA 280 may have also predicted that another given element 1040 has an associated value of the obstruction-distance parameter 500 and a value of the confidence level to be '1' (as being 1 element away from the given element 1020) and '0.8'.

In some non-limiting embodiments of the present technology, certain elements of the convolved 3D tensor 1002 may be void of values of the obstruction-distance parameter 500 and associated values of the confidence level 1004 as the MLA 280 has been unable to generate those values based on the provided 3D point cloud data 310. In other words, the provided 3D point cloud data 310 could be not sufficient (due to sparsity thereof) for the MLA 280 to generate values of the obstruction-distance parameter 500 and the confidence level 1004 for these certain elements of the convolved 3D tensor 1002. However, those certain elements of the convolved 3D tensor may potentially contain so-called "un-detected" obstacles.

In this regard, according to the non-limiting embodiments of the present technology, the processor 110 may be configured to augment such elements of the convolved 3D tensor 1002 with values of the obstruction-distance parameter 500 and associated values of the confidence level 1004 based on elements, for which these values are already known.

In the non-limiting embodiments of the present technology, an un-detected obstacle may be a dynamic object that has been detected in one element of the convolved 3D tensor 1002, and cannot be detected in the other one due to uncoordinated moving parameters (such as speed) between the vehicle 220 and the dynamic object, poor scanning conditions (weather), other obstacles, or the like. Also, the un-detected obstacle may be a part of a static obstacle (a guardrail, for example) that has been detected in the one element of the convolved 3D tensor 1002, however, is obscured in the other element the convolved 3D tensor 1002 by another object, poor scanning conditions (weather), or the like.

In this regard, the processor 110 may be configured to augment a given element of the convolved 3D tensor 1002 with values of the obstruction-distance parameter 500 and the confidence level 1004 based on the respective values of another element of the convolved 3D tensor 1002 and an obstacle pattern of a given obstacle associated therewith.

In the non-limiting embodiments of the present technology, the processor 110 may generate data indicative of obstacle patterns based on data generated by at least one of the first sensor 230, the second sensor 240, and other (such as radar and the like) sensors, or a combination thereof.

Further, in some non-limiting embodiments of the present technology, the processor 110 is configured to augment the given element of the convolved 3D tensor 1002 with values of the obstruction-distance parameter 500 and the confidence level 1004 based also on a projection trigger. Broadly speaking, the projection trigger is an expected change parameter, based on the received obstacle pattern, of the given obstacle from the other element of the convolved 3D tensor 1002. In specific non-limiting embodiments of the present technology, the projection trigger is based at least on a current speed of the vehicle 220. It can be said that the projection trigger is a parameter that takes into account dynamic movement of the vehicle 220 for augmenting the given element of the convolved 3D tensor 1002 with data.

In the non-limiting embodiments of the present technology, the processor 110 may use the other element of the convolved 3D tensor 1002 for augmenting the given one based on a predetermined threshold value of the confidence level 1004 (0.8, for example). As such, the processor 110 would not use the other element for augmenting if its associated value of the confidence level is lower than '0.8'.

In additional non-limiting embodiments of the present technology, the processor 110 is configured to augment the given element with a value of the confidence level 1004 lower than that of the other element of the convolved 3D tensor 1002.

In the depicted embodiments of FIG. 10, as mentioned above, the processor 110 has determined that the given element 1020 of the convolved 3D tensor 1002 contains an obstacle therein. Further, the processor 110, by the MLA 280, has determined that the other given element 1040 is associated with the values of the obstruction-distance parameter 500 and of the confidence level 1004 '1' and '0.8', respectively. A yet another given element 1060 of the convolved 3D tensor 1002 may not have received any data from the 3D point cloud data 310, and as such, the MLA 280 has been unable to predict any respective value for the given element 1060. To that end, the processor 110 is configured to augment the given element 1060 with values of the obstruction-distance parameter 500 and the confidence level 1004 based on another element, for which these values are known—for example, those of the given element 1040. Further, the processor 110 may also consider an obstacle pattern of the object located in the given element 1020 and a projection trigger associated with the vehicle 220 at the given moment in time.

Accordingly, as the value of the confidence level 1004 of the given element 1040 is '0.8', the processor 110 may proceed and augment, based on the data above, the given element 1060 with a value of the confidence level 1004 '0.7', for example.

Finally, the processor 110 assigns the given element 1060 with a respective value of the obstruction-distance parameter 500, which is in the depicted embodiments 3. Thus, the given element 1060 acquires values of the obstruction-distance parameter 500 and the confidence level 1004 '3' and '0.7', respectively, based on the respective values of the given element 1040. In accordance with the non-limiting embodiments of the present technology, as mentioned above in respect of the description of the training process, the processor 110 may be configured to generate the grid 400 based on the convolved 3D tensor 1002. It can be said that the processor 110 is configured to "collapse" the convolved 3D tensor 1002 along the z axis. Consequently, each cell of the plurality of cells 402 of the grid 400 would be characterized by planar Cartesian coordinates (x, y) of a base of a respective element of the convolved 3D tensor 1002. Also, each cell of the grid 400 would be assigned a respective value of the obstruction-distance parameter 500 and a value of the confidence level 1004.

In the non-limiting embodiments of the present technology, the augmentation procedure described above in respect of augmenting certain elements of the convolved 3D tensor 1002 may be applied mutatis mutandis to certain cells of the plurality of cells 402 of the grid 400, i.e. to the embodiments where the augmenting is performed after generating the grid 400 based on the convolved 3D tensor 1002.

Thus, the processor 110 is configured to use the grid 400 to determine, based on the obstruction-distance parameter 500 and associated confidence level, presence of objects in the surrounding area of the vehicle 220.

Figure 11:
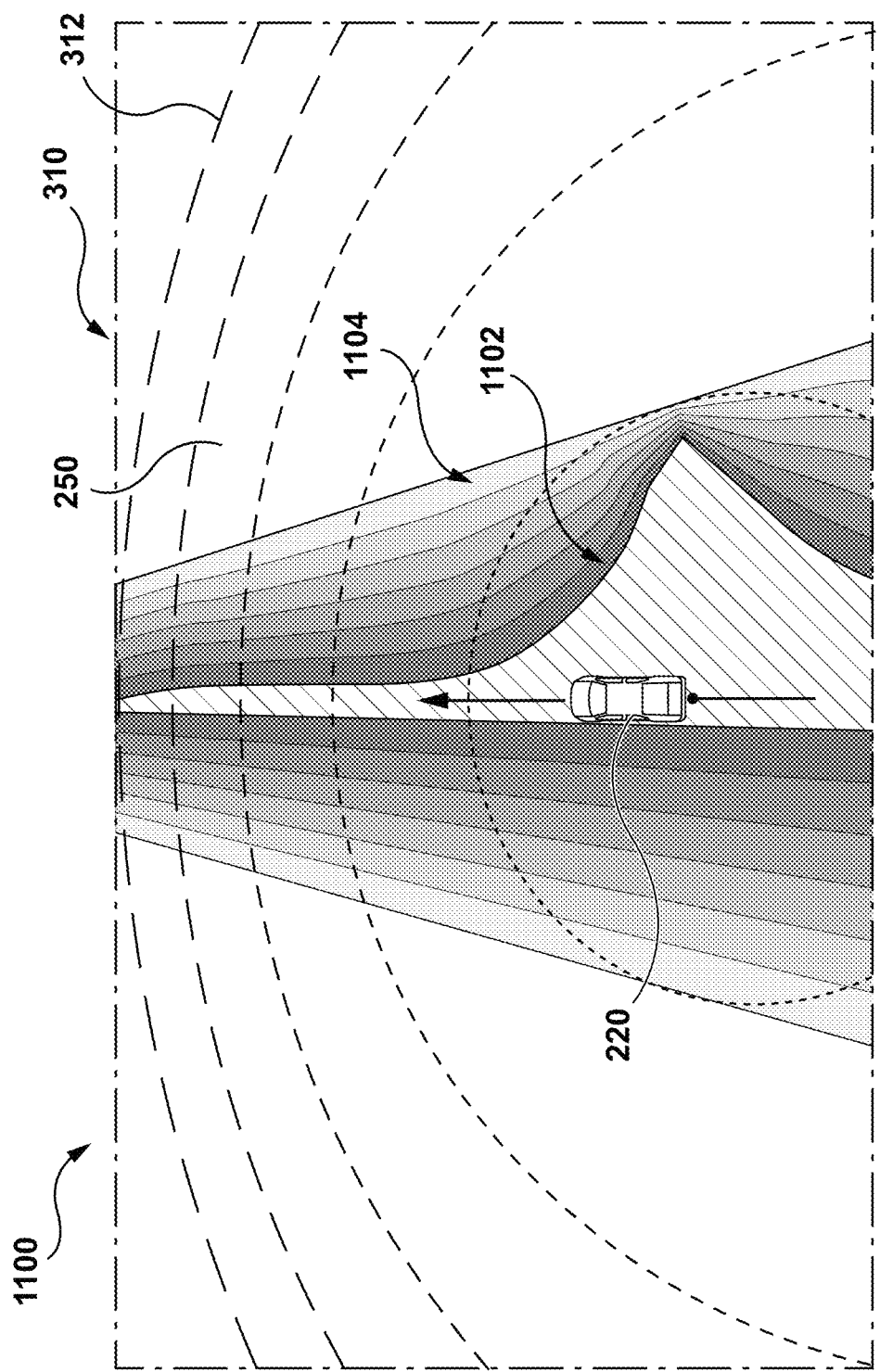
FIG. 11 depicts a visual representation of the surrounding area 250 around the vehicle of FIG. 2 with an applied grid representation generated, by the processor of the electronic device of the networked computer environment of FIG. 2, in the in-use process of FIG. 10, in accordance with the non-limiting embodiments of the present technology.

With reference now to FIG. 11, there is depicted a visual representation 1100 the surrounding area 250 of the vehicle 220 with application of the grid 400, according to the non-limiting embodiments of the present technology. It is noted that in some embodiments of the present technology, the visual representation 1100 is used for determining the trajectory of the vehicle 220 and, as such, does not need to be outputted on a visual interface, but rather used for internal processing.

As it can be appreciated from FIG. 11, the surrounding area 250 of the vehicle 220 is divided, based on values of the obstruction-distance parameter 500 of associated cells of the grid 400, into two zones: a high-obstacle-likelihood zone 1102 and a low-obstacle-likelihood zone 1104. The high-obstacle-likelihood zone 1102 (a darker zone) comprises cells of the grid 400 having low values of the obstruction-distance parameter 500 and high values of the confidence level 1004 (greater or equal to the predetermined threshold value). Accordingly, the low-obstacle-likelihood zone 1104 (a lighter zone) comprises cells of the grid 400 having high values of the obstruction-distance parameter 500.

As it can be further appreciated, in the visual representation 1100, the high-obstacle-likelihood zone 1102 and the low-obstacle-likelihood zone 1104 are fused by a colour gradient, such that the darker a given spot between the two zones is—the likelier a presence of an obstacle therein is. By contrast, as it becomes lighter between the two zones, a likelihood of a presence of an object therein declines.

Figure 12:
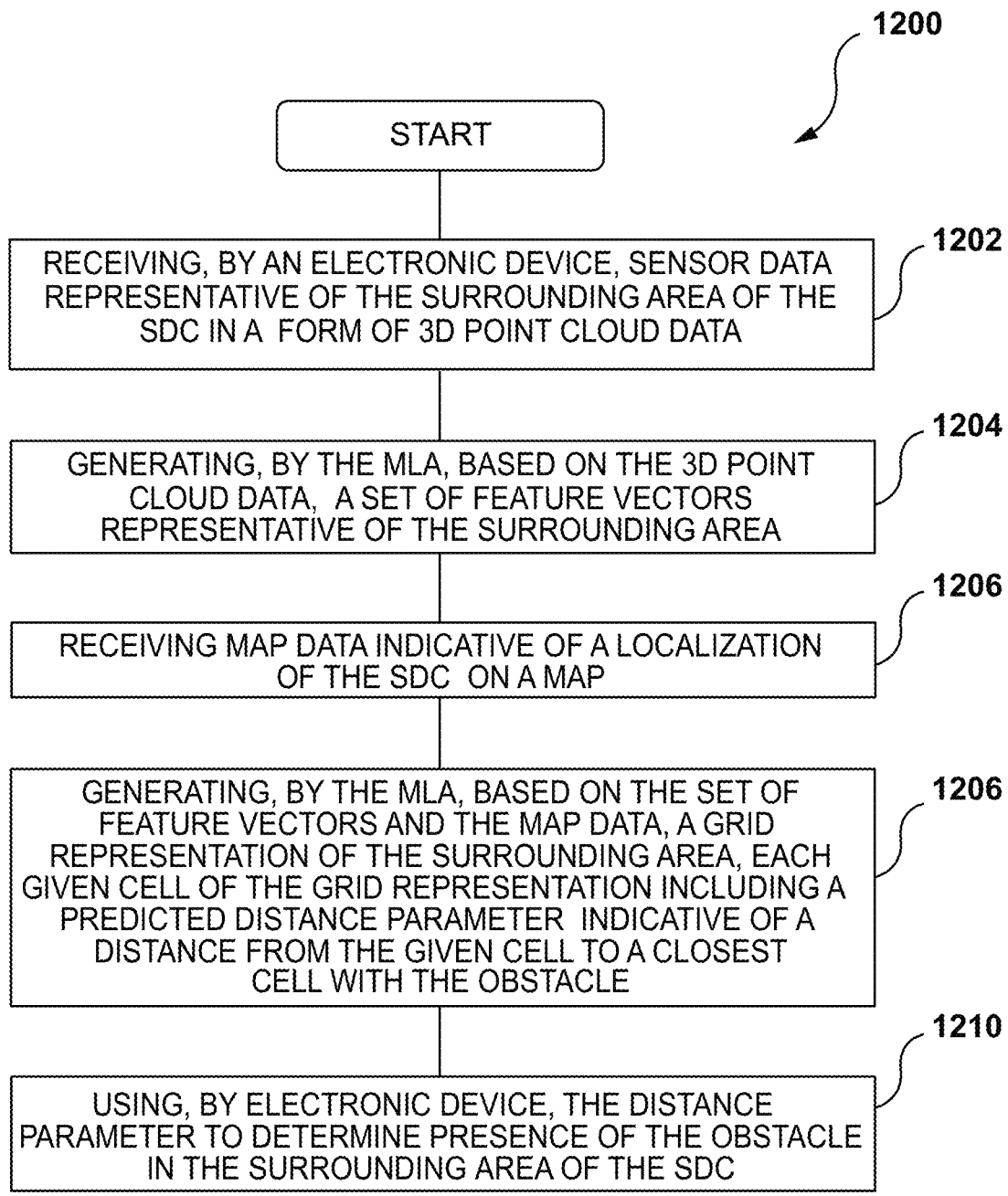
FIG. 12 depicts a flow chart of a method for determining a presence of an object in the surrounding area 250 around the vehicle present in the networked computer environment of FIG. 2, the method executable in the networked computing environment of FIG. 2, in accordance with the non-limiting embodiments of the present technology.

Given the architecture and the examples provided hereinabove, it is possible to execute a method for determining a presence of an obstacle in a surrounding area of an SDC (the vehicle 220, for example). With reference now to FIG. 12, there is depicted a flowchart of a method 1200, according to the non-limiting embodiments of the present technology. The method 900 is executable by the processor 110. The processor 110 may, for example, be part of the electronic device 210.

Step 1202—Receiving, by an Electronic Device, Sensor Data Representative of the Surrounding Area of the SDC in a Form of 3D Point Cloud Data At step 1202, the processor 110 of the electronic device 210 is configured to receive the sensor data 305, generated by the second sensor 240, of the surrounding area 250 in the form of the 3D point cloud data 310. The 3D point cloud data 310 comprises 3D points of objects located in the surrounding area 250 of the vehicle 220.

Step 1204—Generating, by the MLA, Based on the 3D Point Cloud Data, a Set of Feature Vectors Representative of the Surrounding Area At step 1204, the processor 110 is first configured to apply the 3D grid 620 onto the 3D point cloud data 310, thereby generating the pre-processed 3D point cloud data, as described above with reference to FIG. 6. Accordingly, each 3D point of the 3D point cloud data 310 is associated with a respective one of the plurality of cells 650.

Second, the processor 110 is configured to generate, for each of the plurality of cells 650 a feature vector, a given feature vector is representative of points associated with a respective one of the plurality of cells in the pre-processed 3D point cloud data.

To that end, in the non-limiting embodiments of the present technology, the processor 110 is configured to execute an MLA, for example the MLA 280.

In the non-limiting embodiments of the present technology, the MLA 280 has been trained, as described hereinabove with reference to FIGS. 6 to 9, to determine presence of obstacles in the surrounding area 250 of the vehicle 220.

In the non-limiting embodiments of the present technology, the MLA 280 comprises two models (for examples, the first model 700 and the second model 900). In these embodiments, the first model 700 may be, for example, a CNN implemented based on PointNet architecture and the second model 900 may be a CNN having a U-Net architecture.

In the non-limiting embodiments of the present technology, the first model 700 and the second model 900 have been trained based on a training set that includes a training grid (similar to the one described above with reference to FIGS. 4 and 5). Each cell of the training grid includes information of actual distance to closest an other cell containing an obstacle therein.

Thus, in the non-limiting embodiments of the present technology, the processor 110 is configured, using the first model 700, to generate, for each one of the plurality of cells 650 of the pre-processed 3D point cloud data, a feature vector representative of points associated therewith, as described above with reference to FIG. 7.

In some non-limiting embodiments of the present technology, a given feature vector describes associated points of the respective one of the plurality of cells 650 based on a plurality of features. Thus, the processor 110 associates each feature vector with a respective one of the plurality of cells 650, thereby generating a 3D tensor.

In some non-limiting embodiments of the present technology, the plurality of features of the given feature vector may comprise features indicative of geometrical position of each of the associated points of the respective one of the plurality of cells 650 of the pre-processed 3D point cloud data. In other non-limiting embodiments of the present technology, the plurality of features may further comprise features indicative of light intensity of each of the associated points of the respective one of the plurality of cells 650.

Thus, in the non-limiting embodiments of the present technology, each element of the 3D tensor, generated in the way described above, is associated, by a respective feature vector, with a respective one of the plurality of cells 650 of the pre-processed 3D point cloud data.

Further, according to the non-limiting embodiments of the present technology, the processor 110 may be configured to generate, based on feature vectors associated with cells of a given column of the 3D tensor, a respective amalgamated vector. The respective amalgamated vector includes combined information over the given column of the 3D tensor.

The processor 110 may be configured to generate the respective amalgamated vector, for example, by applying the amalgamating procedure 800 described above with reference to FIG. 8. In some non-limiting embodiments of the present technology, the amalgamating procedure 800 includes concatenating associated feature vectors of the cells of the given column of the 3D tensor.

Thus, the processor 110 is configured to generate a modified 3D tensor where each element is associated with a respective amalgamated vector that is representative of geometrical positions of 3D points of the 3D point cloud data 310.

Step 1206—Receiving Map Data Indicative of a Localization of the SDC on a MAP At step 1206, the processor 110 is configured to acquire, from at least one of the first sensor 230, the second sensor 240, and the other sensor (not depicted), data for localizing the vehicle 220.

In some non-limiting embodiments of the present technology, the processor 110 may be configured to acquire, using at least one of the first sensor 230, the second sensor 240, and the other sensors (not depicted), one of vehicle parameters, as the vehicle 220 is in operation. In the non-limiting embodiments of the present technology, the vehicle parameters may comprise: latitude, longitude, gear, wheel rotation speed, inertial measurement unit (IMU) values (i.e. linear acceleration components and rotational rate components of the vehicle 220), throttle, steering angle, and speed, as well as other parameters relating to the vehicle 220 while it is travelling. The localization of the vehicle 220 may be augmented by a 3D map (not depicted).

In some non-limiting embodiments of the present technology, the 3D map (not depicted) may include one or more landmark objects of the surrounding area 250 of the vehicle 220, such as road boundaries, lanes, signs, poles, and traffic lights, for example, which may help during navigation or obstacle recognition.

Step 1208—Generating, by the MLA, Based on the Set of Feature Vectors and the Map Data, a Grid Representation of the Surrounding Area, Each Given Cell of the Grid Representation Including a Predicted Distance Parameter Indicative of a Distance from the Given Cell to a Closest Cell with the Obstacle At step 1208, the processor 110 is configured, based on the modified 3D tensor nd the acquired map data, and using the second model 900, to generate a convolved 3D tensor, for example, the convolved 3D tensor 1002, as described in detail with reference to FIGS. 9 and 10.

In the non-limiting embodiments of the present technology, the processor 110 may be further configured to generate the grid 400 (depicted in FIGS. 4 and 5), based on the convolved 3D tensor 1002.

Each cell of the plurality of cells 402 of the grid 400 is associated with a respective predicted, by the second model 900, value of the obstruction-distance parameter 500. The obstruction-distance parameter 500 is indicative of a distance to closest an other cell containing an obstacle therein.

In some non-limiting embodiments of the present technology, each cell of the plurality of cells 402 of the grid 400 is further associated with a respective value of a confidence parameter generated by the second model 900 (the confidence level 1004 described in detail above with reference to FIG. 10, for example). Each value of the confidence level 1004 is indicative of how accurate the second model 900 has predicted a respective value of the obstruction-distance parameter 500.

Further, according to the non-limiting embodiments of the present technology, the processor 110 is configured to identify cells of the grid 400 potentially having un-detected obstacles. In other words, the processor 110 is configured to identify cells of the grid 400, for which the second model 900 has been unable to generate respective values of the obstruction-distance parameter 500 and the confidence level 1004 based on the received 3D point cloud data 310, for example, due to sparsity thereof. Therefore, the processor 110 is configured to augment such cells of the grid 400 by generating those values, based on the respective known values of the obstruction-distance parameter 500 and the confidence level 1004 associated with other cells of the grid 400, as described in detail above with reference to FIG. 10.

Thus, the processor 110 is configured to generate, by the second model 900, based on an output of the first model 700, i.e. the modified 3D tensor, the grid 400, the visual representation of which, applied onto the surrounding area 250, is depicted in FIG. 11.

Step 1210—Using, by the Electronic Device, the Distance Parameter to Determine Presence of the Obstacle in the Surrounding Area of the SDC Finally, at step 1210, the processor 110 is configured to use each value of the obstruction-distance parameter 500 of an associated one of the plurality of cells 402 of the grid 400 for determining presence of obstacles in the surrounding area 250 of the vehicle 220. For example, the processor 110 may use the values of the obstruction-distance parameter 500 for generating or modifying a trajectory for the vehicle 220.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for determining a presence of an obstacle in a surrounding area of a self-driving car (SDC) based on sensor data acquired by a sensor mounted on the SDC, the method executable by an electronic device coupled to the SDC, the electronic device executing a machine learning algorithm (MLA), the MLA having been trained for determining a distance to a closest obstacle among a plurality of objects detected in the surrounding area, the MLA having been trained on a training set of data, the training set of data having been generated by:
- receiving, by the electronic device, training sensor data of the surrounding area of the SDC;
- applying, by the electronic device, to the training sensor data, a training grid;
- assigning, by the electronic device, to a given cell of the training grid, a respective assessor-generated label, the respective assessor-generated label being indicative of a distance between the given training cell and a closest other training cell containing a training obstacle therein;

the method comprising:
- receiving, by the electronic device, (i) the sensor data representative of the surrounding area of the SDC in a form of 3D point cloud data; and (ii) map data indicative of a localization of the SDC on a map;
- generating, by the MLA, based on the 3D point cloud data, a set of feature vectors representative of the surrounding area;
- generating, by the MLA, based on the set of feature vectors and the map data, a grid representation of the surrounding area, each given cell of the grid representation including a predicted distance parameter indicative of a distance from the given cell to a closest cell with the obstacle; and
- using, by the electronic device, the predicted distance parameter to determine the presence of the obstacle in the surrounding area of the SDC.

2. The method of claim 1, wherein the predicted distance parameter is further associated with an indication of a confidence level in the predicted distance parameter, the confidence level having been predicted by the MLA.

3. The method of claim 1, wherein the MLA comprises a first model and a second model.

4. The method of claim 3, wherein the set of feature vectors representative of the surrounding area is generated by the first model.

5. The method of claim 4, wherein the generating, based on the 3D point cloud data, the set of feature vectors representative of the surrounding area comprises:
- generating a tensor having a plurality of cells, each cell being associated with a position in the 3D point cloud data;
- generating, by the first model, a given vector associated with a given point of the 3D point cloud data;
- associating the given vector with an associated cell of the 3D point cloud data.

6. The method of claim 5, wherein the method further comprises generating an amalgamated vector associated with a column of the tensor.

7. The method of claim 6, wherein the generating the amalgamated vector comprises concatenating a totality of given vectors associated with the cells of the column of the tensor.

8. The method of claim 5, wherein the given vector is representative of at least geometrical position of the given point of the 3D point cloud data.

9. The method of claim 3, wherein the first model comprises a PointNet model.

10. The method of claim 3, wherein the generating the grid representation of the surrounding area is executed by the second model.

11. The method of claim 10, wherein the second model comprises a U-Net model.

12. The method of claim 10, wherein the second model is configured to generate the predicted distance parameter based on an output of the first model.

13. The method of claim 12, wherein the output of the first model comprises:
- a tensor having a plurality of cells, each cell being associated with an amalgamated vector associated with a respective column of the tensor previously generated by the first model;
- a given amalgamated vector being representative of at least geometrical positions of points of the 3D point cloud data placed in a given cell of the tensor.

14. The method of claim 1, wherein the method further comprises training the MLA, the training being executed prior to the receiving.

15. The method of claim 1, wherein the method further comprises identifying, by the MLA, cells of the grid representation with un-detected obstacles.

16. The method of claim 15, wherein the identifying, by the MLA, cells of the grid representation with the un-detected obstacles comprises:
- determining a first cell of the grid representation having a predicted presence indicator of the obstacle;
- determining a second cell of the grid representation located in a pre-determined spaced relationship to the first cell, the second cell not having the predicted presence indicator of the obstacle;
- in response to a confidence parameter of the first cell being above a pre-determined threshold and in response to a projection trigger being present, augmenting the second cell with the predicted presence indicator of the obstacle.

17. The method of claim 16, wherein the augmenting the second cell with the predicted presence indicator of the obstacle comprises assigning a confidence parameter that is lower than the respective confidence parameter of the first cell.

18. An electronic device for determining a presence of an obstacle in a surrounding area of a Self-Driving Car (SDC) based on sensor data acquired by a sensor mounted on the SDC, the electronic device comprising:
- a processor;
- a non-transitory computer-readable medium comprising instructions, the instructions for executing at least a machine learning algorithm (MLA),
  - the MLA having been trained for determining a distance to a closest obstacle among a plurality of objects detected in the surrounding area, the MLA having been trained on a training set of data, the training set of data having been generated by:
    - receiving, by the electronic device, training sensor data of the surrounding area of the SDC;
    - applying, by the electronic device, to the training sensor data, a training grid;
    - assigning, by the electronic device, to a given cell of the training grid, a respective assessor-generated label, the respective assessor-generated label being indicative of a distance between the given training cell and a closest other training cell containing a training obstacle therein;
- a communication interface for communicating with the sensor mounted on the SDC,
- the processor, upon executing the instructions, being configured to:

receive (i) the sensor data representative of the surrounding area of the SDC in a form of 3D point cloud data; and (ii) map data indicative of a localization of the SDC on a map;

generate, by the MLA, based on the 3D point cloud data, a set of feature vectors representative of the surrounding area;

generate, by the MLA, based on the set of feature vectors and the map data, a grid representation of the surrounding area, each given cell of the grid representation including a predicted distance parameter indicative of a distance from the given cell to a closest cell with an obstacle; and use the predicted distance parameter to determine the presence of the obstacle in the surrounding area of the SDC.

19. A method for determining a presence of an obstacle in a surrounding area of a self-driving car (SDC) based on sensor data acquired by a sensor mounted on the SDC, the method executable by an electronic device coupled to the SDC, the electronic device executing a machine learning algorithm (MLA) having been trained for obstacle detection based on sensor data, the method comprising:
  receiving, by the electronic device, (i) the sensor data representative of the surrounding area of the SDC in a form of 3D point cloud data; and (ii) map data indicative of a localization of the SDC on a map;

generating, by the MLA, based on the 3D point cloud data, a set of feature vectors representative of the surrounding area;

generating, by the MLA, based on the set of feature vectors and the map data, a grid representation of the surrounding area, a given cell of the grid representation including a respective predicted distance parameter indicative of a distance from the given cell to a closest cell with the obstacle;

identifying, by the electronic device, cells of the grid representation with un-detected obstacles, the identifying comprising:
  determining, by the electronic device, a first cell of the grid representation having the respective predicted presence indicator of the obstacle;
  determining, by the electronic device, a second cell of the grid representation located in a pre-determined spaced relationship to the first cell, the second cell not having the respective predicted presence parameter of the obstacle;
  in response to a confidence parameter of the first cell being above a pre-determined threshold and in response to a projection trigger being present, augmenting the second cell with the respective predicted presence parameter of the obstacle; and using, by the electronic device, the predicted distance parameter to determine presence of the obstacle in the surrounding area of the SDC.

* * * * *